United States Patent
Rossi

(10) Patent No.: US 8,498,414 B2
(45) Date of Patent: Jul. 30, 2013

(54) SECURE ROUTE OPTIMIZATION IN MOBILE INTERNET PROTOCOL USING TRUSTED DOMAIN NAME SERVERS

(75) Inventor: Angelo Rossi, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 189 days.

(21) Appl. No.: 12/969,072

(22) Filed: Dec. 15, 2010

(65) Prior Publication Data

US 2012/0110334 A1    May 3, 2012

Related U.S. Application Data

(60) Provisional application No. 61/408,276, filed on Oct. 29, 2010.

(51) Int. Cl.
*H04L 29/06* (2006.01)

(52) U.S. Cl.
USPC ............ 380/249; 380/247; 726/2; 726/3; 726/4; 726/5; 726/6; 726/7

(58) Field of Classification Search
USPC ............ 380/249, 247; 726/2, 3, 4, 5, 6, 7
See application file for complete search history.

(56) References Cited

U.S. PATENT DOCUMENTS

| | | | | |
|---|---|---|---|---|
| 7,162,529 | B2 * | 1/2007 | Morishige et al. | 709/230 |
| 7,720,059 | B2 * | 5/2010 | Lee | 370/389 |
| 8,145,906 | B2 * | 3/2012 | Choi et al. | 713/168 |
| 2002/0059452 | A1 * | 5/2002 | Yokota et al. | 709/238 |
| 2002/0080752 | A1 * | 6/2002 | Johansson et al. | 370/338 |
| 2002/0167922 | A1 * | 11/2002 | Inoue et al. | 370/331 |
| 2002/0176383 | A1 * | 11/2002 | Inoue et al. | 370/331 |
| 2003/0084293 | A1 * | 5/2003 | Arkko et al. | 713/168 |
| 2003/0176188 | A1 * | 9/2003 | O'Neill | 455/433 |
| 2003/0204728 | A1 * | 10/2003 | Irwin | 713/176 |
| 2003/0208568 | A1 * | 11/2003 | Inoue et al. | 709/220 |
| 2003/0224788 | A1 * | 12/2003 | Leung et al. | 455/435.1 |
| 2003/0225900 | A1 * | 12/2003 | Morishige et al. | 709/230 |
| 2004/0013116 | A1 * | 1/2004 | Greis et al. | 370/392 |
| 2004/0023653 | A1 * | 2/2004 | O'Neill | 455/432.1 |
| 2004/0193875 | A1 | 9/2004 | Aura | |
| 2005/0004908 | A1 * | 1/2005 | Ben-Haim et al. | 707/4 |
| 2005/0055315 | A1 * | 3/2005 | Darweesh et al. | 705/59 |
| 2006/0005014 | A1 * | 1/2006 | Aura et al. | 713/162 |
| 2006/0059264 | A1 * | 3/2006 | Leung et al. | 709/227 |
| 2006/0128385 | A1 * | 6/2006 | Lee et al. | 455/436 |

(Continued)

OTHER PUBLICATIONS

Chunlai Du et al., Anti-collusive Self-healing Key Distribution Scheme with Revocation Capability, Information Technology Journal 8 (4), pp. 619-624, 2009, 2009 Asian Network for Scientific Information.

(Continued)

*Primary Examiner* — Edan Orgad
*Assistant Examiner* — Bradley Holder
(74) *Attorney, Agent, or Firm* — Jean-Pierre Fortin; Ericsson Canada Inc.

(57) ABSTRACT

A trusted domain name server is introduced to provide a secure route optimization procedure for MIPv6. A trusted authority registers network addresses of a mobile node with corresponding fully qualified domain names. The trusted domain name server can later be queried to compare the domain of a network address for a mobile node with the domain of a network address for another network node.

16 Claims, 17 Drawing Sheets

U.S. PATENT DOCUMENTS

| | | | |
|---|---|---|---|
| 2006/0198372 A1* | 9/2006 | Lee | 370/389 |
| 2007/0088853 A1* | 4/2007 | Lee et al. | 709/249 |
| 2007/0297377 A1* | 12/2007 | McCann et al. | 370/338 |
| 2008/0207206 A1* | 8/2008 | Taniuchi et al. | 455/436 |
| 2008/0291885 A1* | 11/2008 | Miao et al. | 370/338 |
| 2008/0304457 A1* | 12/2008 | Thubert et al. | 370/338 |
| 2010/0031356 A1* | 2/2010 | Choi et al. | 726/22 |
| 2010/0278120 A1* | 11/2010 | Haddad et al. | 370/329 |
| 2011/0264775 A1* | 10/2011 | Lee et al. | 709/222 |

OTHER PUBLICATIONS

C. Perkins, IP Mobility Support for IPv4, Network Working Group, RFC 3344, Aug. 2002, pp. 1-99.

D. Johnson et al., Mobility Support in IPv6, Network Working Group, RFC 3775, Jun. 2004, pp. 1-165.

J. Arkko et al., Enhanced Route Optimization for Mobile IPv6, Network Working Group, RFC 4866, May 2007, pp. 1-54.

Junhyuk Song et al. ,MIPv6 IP User mobility support through DNS, Internet Draft, Oct. 2001, pp. 1-8.

J. Espi et al., Proactive Route Optimization for FMIPv6, IETF, Internet Draft, Mar. 23, 2010, pp. 1-15.

PCT Search Report from corresponding application PCT/IB2011/054811.

* cited by examiner

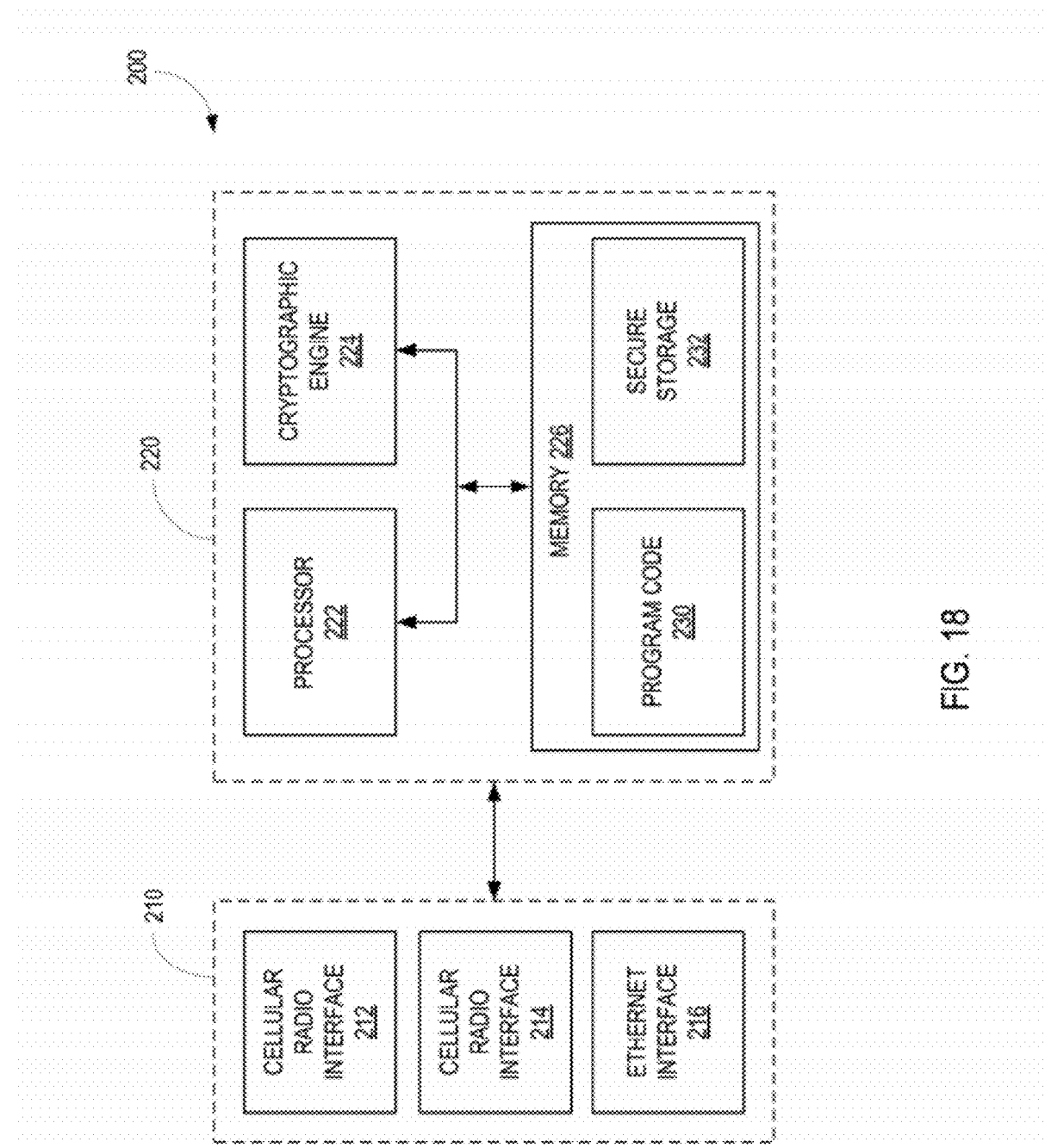

SECURE ROUTE OPTIMIZATION IN MOBILE INTERNET PROTOCOL USING TRUSTED DOMAIN NAME SERVERS

RELATED APPLICATION

This application claims the benefit under 35 U.S.C. §119 of U.S. Provisional Patent Application No. 61/408,276 filed on Oct. 29, 2010 which is incorporated herein by reference in its entirety.

BACKGROUND

The present invention relates generally to the Mobile Internet Protocol for providing Internet access to mobile nodes (e.g., mobile nodes) and, more particularly to secure route optimization in the Mobile Internet Protocol (MIP) using trusted domain name servers.

The Internet provides access to information resources worldwide. Users typically gain access to the Internet from a fixed station located in the home, office, school, or other location. Laptop computers and other portable computing devices provided a first step toward mobile Internet access by allowing the user to connect to the Internet through any connection point offered by the user's service provider. Some service providers, such as America Online (AOL), offer nationwide and/or worldwide access networks for their subscribers. However, laptop computers do not provide true mobile Internet access because the laptop's connection to the Internet during any given session is fixed. True mobile access would allow the user to move freely and change the point of connection to the Internet without disrupting service.

The Mobile Internet Protocol (Mobile IP or MIP) allows a mobile node (MN), such as a cellular phone, smart phone, personal digital assistant, laptop computer, or similar device, to access the Internet via a mobile communication network. Mobile IPv4 (MIPv4) is described in the Internet Engineering Task Force (IETF) Request For Proposal (RFC) 3344. Mobile IPv6 (MIPv6) is described in IETF RFC 3775. The Mobile IP protocol solves the problem of host mobility by using two IP addresses for a mobile node: a fixed home address (HoA) that remains the same regardless of the location of the MN and a "care of" address (CoA) that changes depending on the location of the MN. The home address (HoA) is associated with a home agent (HA) in the MN's home network that provides mobility services. When a MN is away from its home network, the mobile node sends a binding update (BU) to its home agent to bind the current care of address (CoA) to the home address (HoA). A tunneling protocol can be used to establish a link between the home agent and the care of address (CoA). The home agent then forwards packets for the MN to the care of address (CoA) thereby allowing the MN to roam freely within a mobile communication network and to change its point of connection to the Internet without disruption of service.

MIPv6 currently defines two modes of operation: bi-directional tunneling and route optimization (RO). Bi-directional tunneling requires all data packets sent to or from the MN to be routed through the HA. The bi-directional tunneling mode is inherently inefficient, particularly when the MN and the correspondent node (CN) are located near one another compared to the home agent. Route optimization avoids some of the inefficiencies of bi-directional tunneling by allowing data packets to be sent directly between the MN and CN. While route optimization offers advantages over bi-directional tunneling in terms of reduced messaging overhead and reduced bandwidth requirements, it is not very secure and opens the door to numerous security threats. More particularly, the lack of pre-shared information between the MN and the CN makes security in route optimization a difficult challenge. MIPv6 adopts the return routability (RR) mechanism, which is more to verify the MN reachability in both its home address (HoA) and care-of address (CoA) than a security feature. Other works have attempted to solve the multiple security issues in RR but either their design are flawed, or rely on unrealistic assumptions.

Accordingly, it would be advantageous to provide a secure route optimization procedure that eliminates or reduces the security threats.

SUMMARY

A trusted domain name server is introduced to provide a secure route optimization procedure for MIPv6. A trusted authority registers network addresses of a mobile node with corresponding fully qualified domain names. The trusted domain name server can later be queried to compare the domain of a network address for a mobile node with the domain of a network address for another network node.

Exemplary embodiments of the invention comprise a method implemented by a home agent at a network node for registering domain names of a mobile node with a trusted DNS server. The home agent, which may reside in a home network or visited network, receives a first network address for the mobile node. The home agent validates the first network address and if the first address is validated, generates a domain name for the mobile node. The home agent then registers the domain name and first network address with a trusted domain name server to create an association between the domain name and first network address.

Other embodiments of the invention comprise a network node configured as a home agent to register domain names of a mobile node with a trusted domain name server. In one embodiment, the network node comprises a network interface for communicating with other nodes over the communication network and a processor circuit connected to the network interface. The processor circuit receives a first network address for the mobile node and validates the first network address. If the first address is validated, the processor circuit generates a domain name for the mobile node and registers the domain name and first network address with a trusted domain name server to create an association between the domain name and first network address.

Other embodiments of the invention comprise a method implemented by a network node for validating the domain of a network address provided by a mobile node. The network node receives a first network address of a mobile node logically linked with a second network address. The network node obtains corresponding domain names for said first and second network addresses from a trusted domain name server and verifies that a domain of the first network address is the same as a domain of the second network address.

Still other embodiments of the invention comprise a network node for validating the domain of a network address provided by a mobile node. In one embodiment, the network node comprises a network interface for communicating with other nodes over the communication network and a processor circuit connected to the network interface. The processor circuit receives a first network address of a mobile node logically linked with a second network address. The processor circuit obtains corresponding domain names for said first and second network addresses from a trusted domain name server and verifies that a domain of the first network address is the same as a domain of the second network address.

BRIEF DESCRIPTION OF THE DRAWINGS

FIG. 18 illustrates an exemplary network node for implementing secure route optimization.

DETAILED DESCRIPTION

MIPv6 Network Architecture and Protocols

Figure 1:
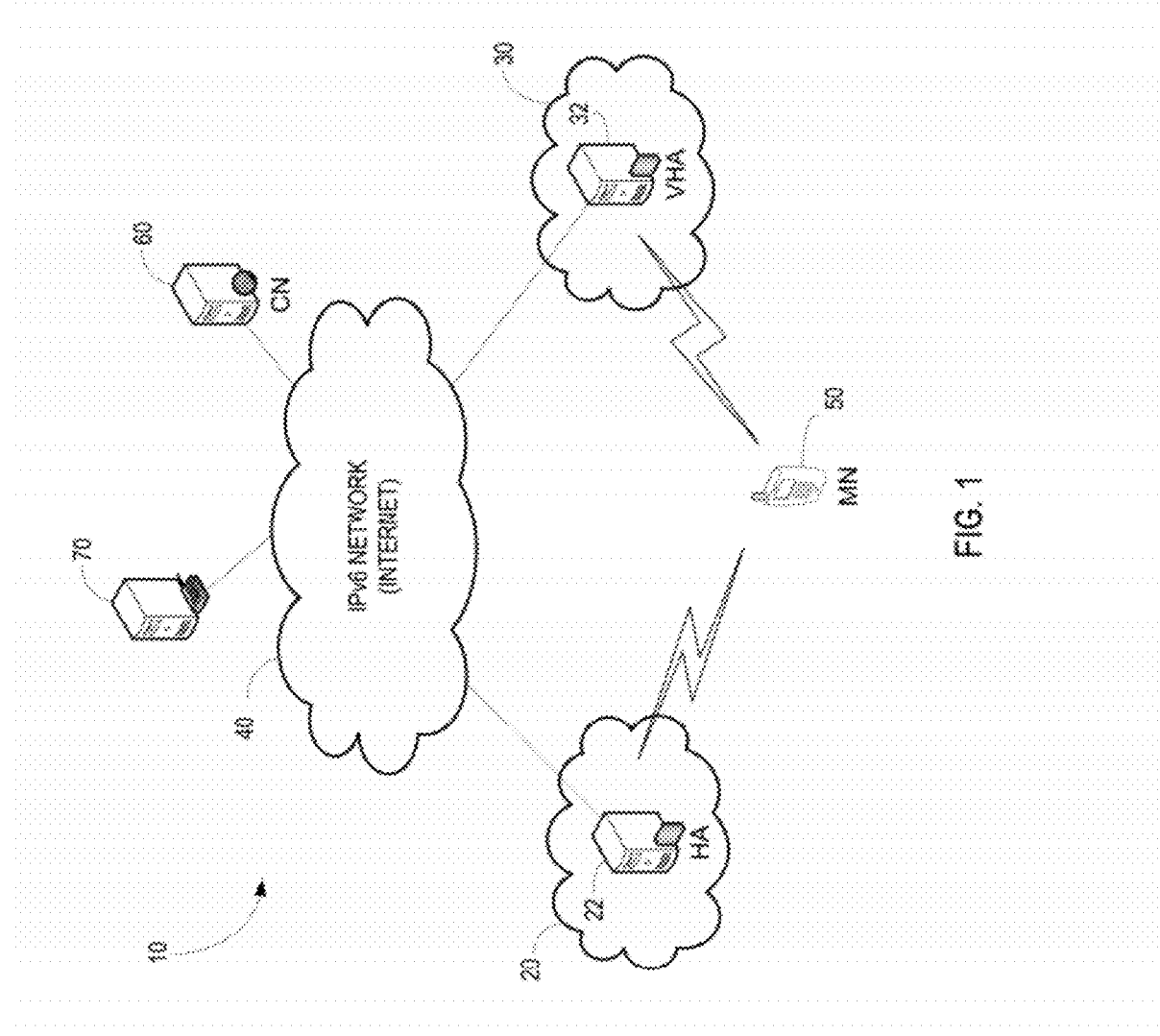
FIG. 1 illustrates an exemplary communication network providing Internet access to mobile terminals.

FIG. 1 illustrates an exemplary communication network 10 providing Internet access to mobile terminals 100. The communication network 10 comprises a home access network 20 (hereinafter the home network 20), a visited access network 30 (hereinafter the visited network 30), and a wide area packet data network (PDN). The home network 20 and visited network 30 may comprise a Public Land Mobile Network (PLMN) based on any communication standard, such as Wideband CDMA (WCDMA), Long Term Evolution (LTE), or WiMAX. The home network 20 and visited network 30 could also comprise wireless local area networks (WLANs), which may comprise public or private networks. The packet data network 40 comprises any public or private IP network, such as the Internet. A domain name server (DNS) 70 is connected to the packet data network (PDN) 40. The communication network enables communication between a mobile node (MN) 50 and a correspondent node (CN) 60.

Both the home network 20 and visited network 30 include mobility agents (MAs) for providing connection to the PDN 40. A home agent (HA) 22 in the home network 20 functions as a mobility agent for a MN 50 when the MN 50 is operating in the coverage area of the home network 20. Similarly, a visited home agent (VHA) 32 functions as a mobility agent for the MN 50 when the MN 50 is operating in the coverage area of the visited network 30. The MN 50 is assigned a permanent IP address called the home address (HoA) which is associated with the HA 22. When the MN 50 is operating in the visited network 30, the MN 50 registers with the VHA 32 and is assigned a temporary address referred to as the care of address (CoA). The MN 50, or an entity acting on its behalf, registers the CoA with the HA 22 and the HA 22 updates the mobility binding by associating the CoA of the MN 50 with its home address.

Figure 2:
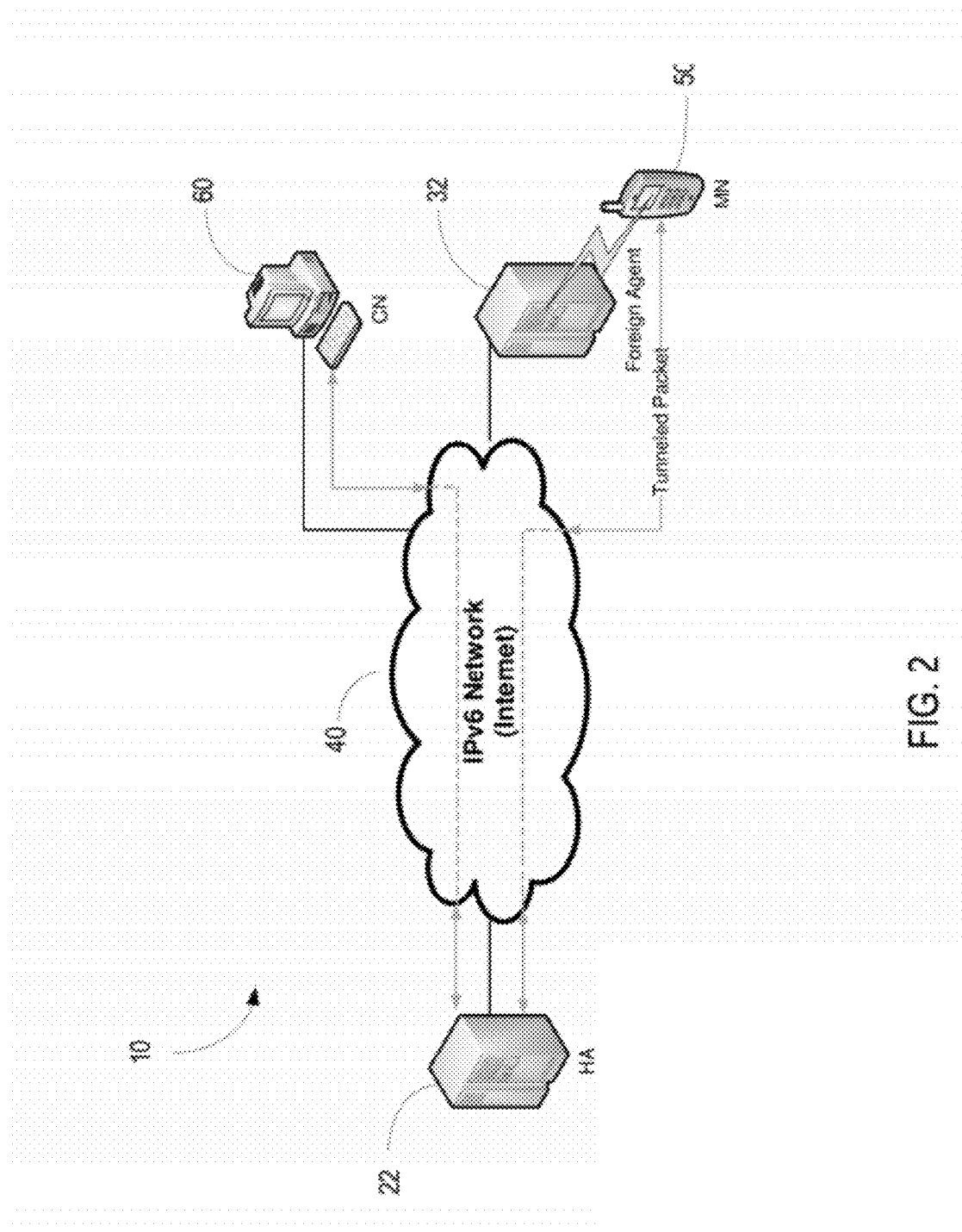
FIG. 2 illustrates bi-directional tunneling in an Internet Protocol version 6 (IPv6) network.

MIPv6 specifies two packet-routing modes when the MN 50 is operating in the visited network 30: bi-directional tunneling and route optimization (RO). With bi-directional tunneling, illustrated in FIG. 2, data packets sent to and from the MN 50 are tunneled through the HA 22 to the CN 60. More particularly, data packets sent by the MN 50 to the CN 60 are encapsulated twice. The inner header contains the home address (HoA) of the MN 50 as the source address and the CN's 60 address as the destination address. The outer header contains the care-of-address (CoA) of the MN 50 as the source address and the HA's address as the destination address. When the HA 22 receives the data packet, it decapsulates the external IP header and forwards the inner IP packet to the CN 60. The CN 60 therefore receives the message with the MN's HoA as the source. When the CN 60 responds, the CN 60 sends a data packet using the HoA of the MN 50 as the destination address. The HA 22 intercepts the message and tunnels the received data packet to the CoA of the MN 50. More particularly, the HA 22 adds a header containing the HA 22 address as the source address and the CoA of the MN 50 as the destination address, and forwards the encapsulated packet to the MN 50. To perform bi-directional tunneling, the HA 22 needs to know the CoA of the MN 50. Therefore, the MN 50 sends its HA 22 a binding update (BU) when it is roaming in a visited network 30. Because all data packets are routed through the HA 22, bi-directional tunneling is inherently inefficient, particularly when the MN 50 and CN 60 are relatively near compared to the HA 22. However, network operators sometimes prefer bi-directional tunneling because if provides more control or monitoring of data packets for billing purposes.

Figure 3:
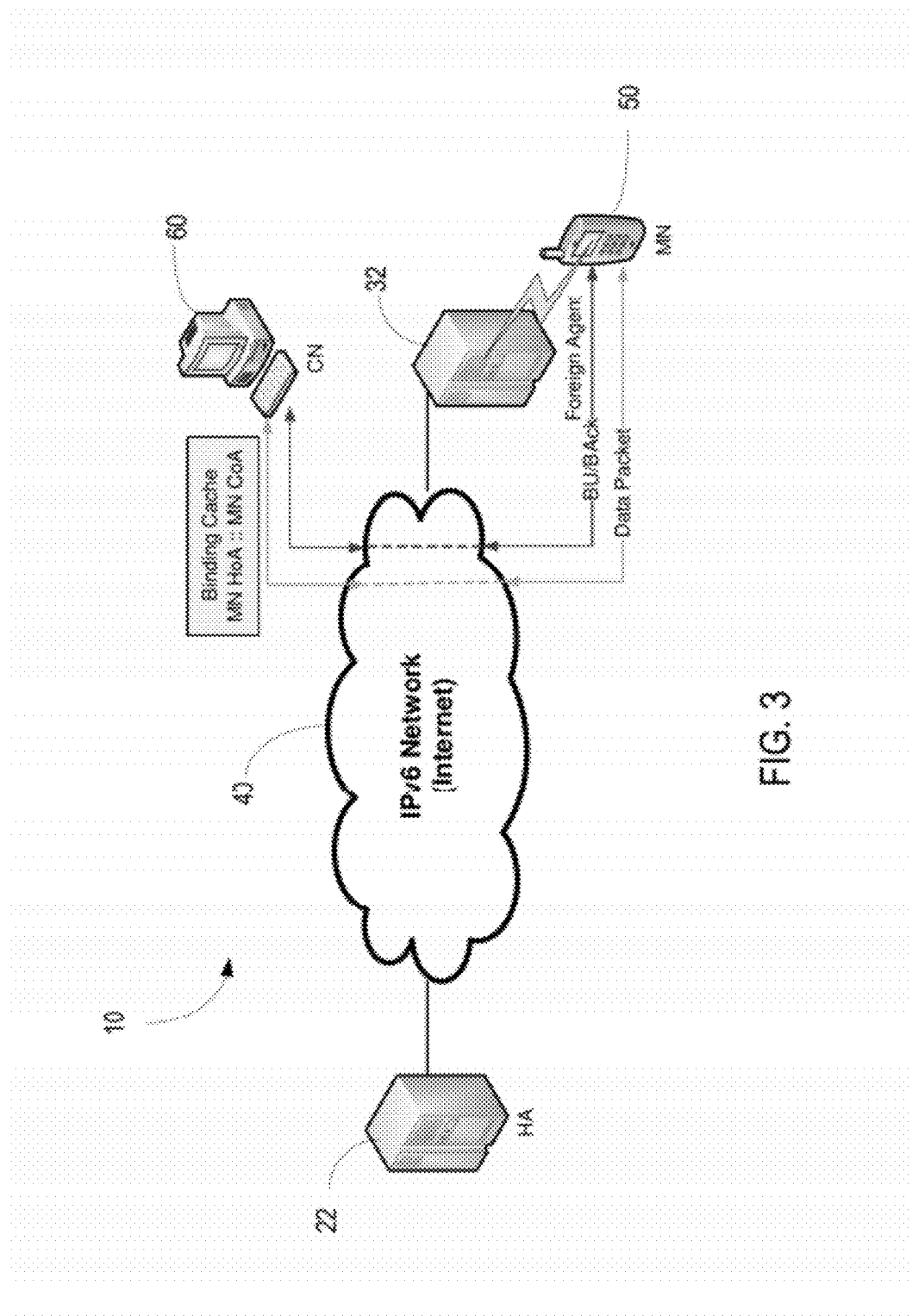
FIG. 3 illustrates route optimization in an IPv6 network.

Route optimization (RO), shown in FIG. 3, avoids some of the inefficiencies of bi-directional tunneling by allowing data packets to be sent directly between the MN 50 and the CN 60. When route optimization is used, the MN 50 sends its current CoA to the CN 60 using binding update (BU) messages. The CN 60 can then send data packets directly to the MN 50 using a type-2 routing header. Before exchanging data packets, the MN 50 and CN 60 execute a return routability (RR) procedure. The main purpose of the RR procedure is to test the reachability of the MN 50 at the CoA and HoA and to generate a shared session key for secure communications between the MN 50 and CN 60.

Figure 4:
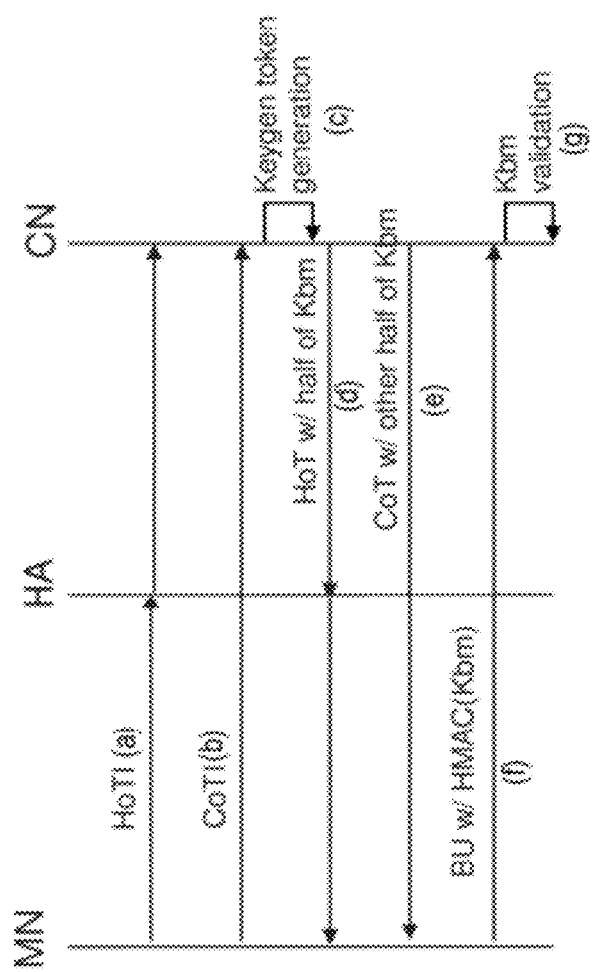
FIG. 4 illustrates an exemplary return routability procedure.

FIG. 4 illustrates the RR procedure. The MN 50 initiates the RR procedure by sending the Home Token Init (HoTI) message tunneled through its HA 22 and the Care-of Token Init (CoTI) message directly to the CN 60, both carrying a distinct init cookie which is later returned (steps a and b). Upon reception, the CN 60 generates the home token (HoT) and care-of token (CoT) (step c). The HoT and CoT each contain a cleartext keygen token, which is generated by taking the first 64 leftmost bits of $H(K_{CN}.HoA.Ni.0)$ and $H(K_{CN}.CoA.Nj.1)$ respectively where Ni and Nj are nonces and KCN is a 20-byte long random string kept secretly by the CN 60. The CN 60 sends the tokens and $K_{CN}$ to the MN 50. More particularly, the CN 60 sends HoT and half of $K_{bm}$ to the MN's HoA (step d). CN 60 sends CoT and the other half of $K_{bm}$ to the MN's CoA (step e). When the MN 50 receives the HoT and CoT messages from the CN 60, it concatenates both keygen tokens and hashes it to generate a binding management key ($K_{bm}$) which is used to sign binding updates (BU) sent to the CN 60 (step f). When the CN 60 receives a BU with a hashed message authentication code (HMAC), it reconstructs the HoT and CoT based on the HoA and CoA of the Bu request and validates the message (step g).

The main purpose of the RR procedure is to ensure that the MN 50 is reachable at the stated HoA and CoA and, as a secondary objective, to provide a rudimentary way to authenticate and optionally provide confidentiality assuming the symmetric key sent in clear text through the HoT and the CoT has not been intercepted. Obviously, such assumption makes the RR procedure unsuitable for a typical network architecture in which messages are exchanged through untrusted networks such as the Internet or other shared network.

Security Issues in RO

The RR procedure is vulnerable to session hijacking and man-in-the-middle (MITM) attacks. If attacker is able to sniff the HoT from a CN 60, the attacker can forge and send a CoTI to the CN 60 with its own IP address instead of the MNs's CoA. The CN 60 will respond with the CoT, which the attacker can use in combination with the intercepted HoT to generate a valid binding update management key (KBU). The attacker can then send a legitimate BU to the CN 60 to redirect the flow toward himself. The attacker can then act as an intermediary between the MN 50 and the CN 60 and read all the messages.

The RR procedure is also vulnerable to denial of service (DoS) and flooding attacks. DoS attacks typically exploit limitations in a target's resources. Therefore, the MN 50 and possibly even the CN 60 are the most vulnerable because of their limited processing power, memory, and bandwidth. An attacker could dramatically increase the CN 60's workload by intercepting $N_H$ home tokens and $N_C$ care-of tokens and send $N_H \times N_C$ legitimate BUs, forcing the CN 60 to store many sessions in memory and redirect multiple flows in a very short period of time. Note, however, that in order to make this attack successful, the forged BUs must be sent to the CN 60 before the nonces are refreshed.

Network flooding DoS attacks can also be led on MNs 50 or, more broadly, on a visited network 30 if an attacker manages to redirect only signaling MIPv6 messages without being in the data path. Such a favorable environment enables the attacker to send forged HoTIs and CoTIs with any HoA and CoA, intercept the related keygens, and redirect the flows to wherever the attacker wishes. A similar but even easier attack is for the attacker to enter a visited network 30, establish multiple RO sessions, and then detach from its care-of link while sending acknowledgments (ACKs) to the CNs 60 to make them believe that it is still active on its CoA.

Certificate-based RO protocols have been proposed to improve the security of route optimization by introducing a certificate scheme and require the trusted entities to execute RO related operations. For example, Ren, Kui and Lou, Wenjing and Zeng, Kai and Bao, Feng and Zhou, Jianying and Deng, Robert H., *Routing optimization security in mobile IPv6, Computer Networks*, Volume 50, issue 13, pp 2401-2419, 2006 (hereinafter "Routing Optimization") describes a Certificate-based Binding Update (CBU) protocol that makes use of a Certificate Authority (CA) to issue a certificate for every home link subnet prefix (HLSP) from which the private key is kept secretly by the HA 22. Upon receiving a RO request and exchanging nonces with the CN 60, the HA 22 provides its HLSP and public key through its certificate signed by a trusted CA. It then starts an authenticated Diffie-Hellman (DH) exchange by signing EXCH0 with its private key in order to share a secret key KDH which is then used to generate $K_{BU}$.

Figure 5:
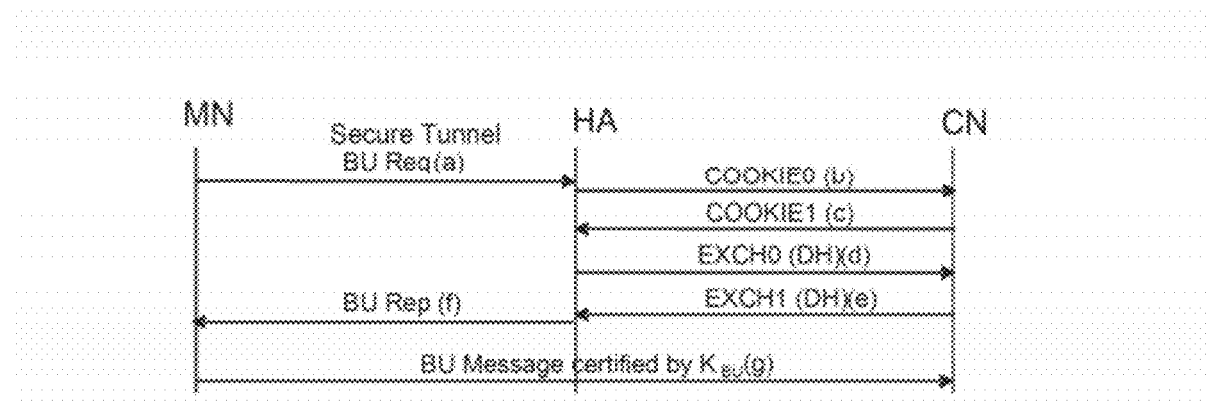
FIG. 5 illustrates an exemplary certificate-based binding update (CBU) procedure.

FIG. 5 shows in more detail how the CBU procedure works. When a MN 50 wants to establish a direct communication with the CN 60, it first sends a BU request to its HA 22 through its IPSec secured tunnel specifying its HoA and CN 60 addresses (step a). The HA 22 intercepts the message, and establishes a cookie session with the CN 60 to exchange nonces (steps b and c). Once COOKIE1 has been validated by the HA 22, it will send the CN 60 a message signed with its private key and also establish a DH shared key from which the BU key ($K_{BU}$) will be generated. This message contains, among numerous items, the MNs HoA, the HAs DH public value, and the public certificate that is linked with the MN 50's subnet home link (step d). The CN 60 then validates the signature and, most importantly, the certificate by making sure that the MN 50's HoA is part of the home link's subnet stated by the issued certificate. The CN 60 then replies to the HA 22 by proving ownership of the cookies and sending its public DH value (step e). After validating EXCH1, the HA 22 generates $K_{BU}$ by using both DH public values and nonces and then submits it in a BU reply to the MN 50 (step f). Finally, the MN 50 can sign its BU to the CN 60 with $K_{BU}$ (step g).

The CBU procedure has many security flaws. Starting with the computation of $K_{DH}$, an attacker who intercepts g, gx and gy can easily compute the secret keys using a logarithmic function (x=logg(gx)). Also, the CoA in the final BU message sent from the MN 50 to the CN 60 and signed with $K_{BU}$ is not validated by either the HA 22 or the CN 60. Therefore, a legitimate but malicious MN 50 could spoof any victim's IP address or subnet to redirect the flow, leading to redirection-like attacks. Secondly, the assumptions underlying the CBU procedure are unrealistic. The presence of fragmented authentication infrastructures across different domains is necessary to enable the CN 60 to validate the CA that issued the HLSP certificate. This process poses scalability and flexibility issues in trust management when expanding this flat structure into a more global approach. Furthermore, the different administrative domains are typically reluctant to share information or accept trusted CA certificates from competitors.

To tackle some of the CBU security issues, Routing Optimization also proposes an alternative solution called the Hierarchical Certification-based Binding Update (HCBU) procedure. HCBU uses a 3-layer chain certification scheme in which the root Certificate Authorities (CAs) (known by everyone) (layer 1), the intermediate ISPs (layer 2), and finally the MN 50 (layer 3) all sign the 64-bit long IPv6 HoA and CoA subnet prefix of the MN 50. The trust delegation enables the CAs in the operator's domain to generate chain certificates for the HoA and CoA of the MN 50, which can be validated up to the global trusted CAs. Also, the MN 50 must supply to its HA 22 proof of ownership of its CoA signed by the VHA 32 prior the establishment of RO.

Figure 6:
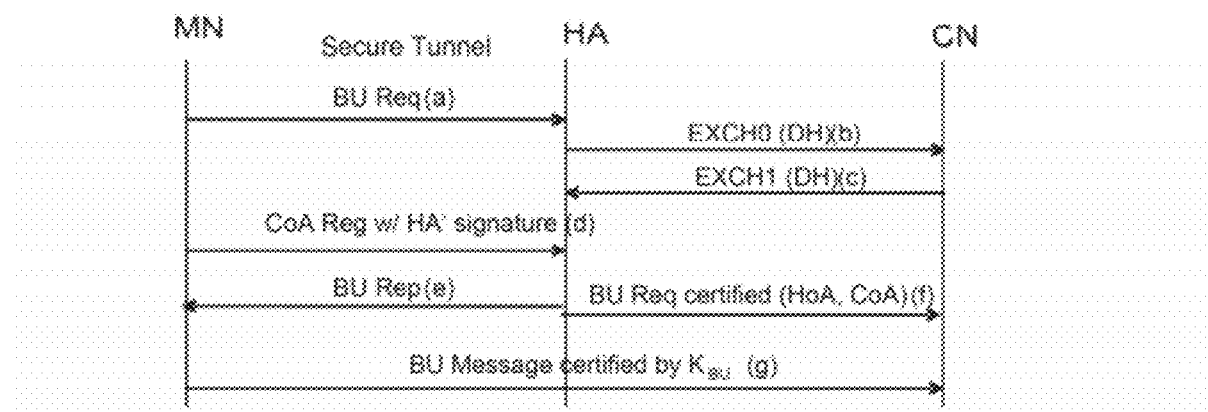
FIG. 6 illustrates an exemplary hierarchical CBU procedure.

FIG. 6 illustrates how the HCBU procedure works in more detail. Similar to the CBU protocol, the MN 50 sends a BU (step a). The HA 22 and the CN 60 set up a cookie session and establishes a DH shared key (steps b and c) following the reception a BU request for a CN 60. When the MN 50 crosses to another network and updates its CoA, it sends a CoA registration (step d) to its home HA 22. The CoA registration includes the signature and the public chain certificate of the VHA 32 in the visited network 30 which assigned the CoA to the MN 50. If the validation of the certificate and the signature contained in the CoA registration is successful, the HA 22 generates the BU key ($K_{BU}$) from the DH public keys and nonces exchanged with the CN 60 and sends it to the MN 50 (step e). At the same time, it sends a signed BU request with its own chain certificate to the CN 60 (step f), confirming that both the MN's HoA and CoA have been validated by the HA 22. Finally, the MN 50 can send a BU message with a signature derived from $K_{BU}$ (step g).

Although HCBU is more secure than CBU, the assumptions underlying the procedure are also unrealistic. First, the global deployment of a 3-layer chain certification of the IPv6 subnet prefix is currently nonexistent and such implementation requires many structural changes and collaboration between many consortiums. Because there is no other use for it, the incentive for such approach is very limited. Second, HCBU procedure does not verify if a bidirectional route exists from the CN 60 to the MN 50 prior to the acceptance of the BU and redirection of the flow. In fact, links across the Internet core are composed of numerous Automated Systems (AS) having different policies (QoS, security, etc.) that may force upstream and downstream flows to travel in different paths between the same two nodes, or worse, deny one of them. Third, the procedure assumes that the security policies between the VHA 32 and HA 22, or between the CN 60 and the HA 22, are always compatible, thus avoiding the scenarios where the HA 22 generates a key too long for the CN 60 (recall that it can be a MN 50) or the VHA 32 signature is non-compliant with the HA's minimal requirements. Also, HCBU is still vulnerable to network flooding attacks.

Cryptographically Generated Addresses (CGAs)

To improve security, MIPv6 supports the use of cryptographically generated addresses (CGAs). A CGA is an IPv6 address where the interface identifier part is generated by a one-way hash function using the public key of the sender and other information. The public key of the sender and other information used to generate the CGA is attached to the transmitted message and the message is signed with the corresponding private key of the sender. If the source address and the public key are known, the recipient can authenticate the message from that corresponding sender.

The intent of CGA is to prevent spoofing attacks by binding the IPv6 address with the public key of the sender through a hash function and signing a hashed message authentication code (HMAC) for each message with the corresponding private key. More specifically, the MN 50 uses the public key, a modifier, and other information to iteratively compute a hash value called hash-2 according to:

$$\text{hash-2} = H([\text{modifier}, 9\_\text{bytes}\_\text{of}\_0, \text{public\_key}]) \quad \text{Eq. 1}$$

In each iteration, the modifier is incremented until hash-2 has 16×SEC leading zeros, where SEC is an integer from 1 to 7 and reflects the level of security. When this condition is satisfied, the modifier is used along with other information, such as the subnet, collision count, public key, etc., to compute another hash value called hash-1. Hash-1 is computed according to:

$$\text{hash-1} = H([\text{modifier}, \text{subnet}, \text{collision\_count}, \text{public\_key}]) \quad \text{Eq. 2}$$

The first 64 bits of hash-1 are then taken and used as the interface identifier (the last 64 bits) of the IP address. The first three bits in hash-1 are replaced by SEC, which is a three-bit integer. Bits 6 and 7 (the "u" and "g" bits) are replaced with zeros. The first 64 bits of the IP address are reserved for the subnet. By providing its CGA Parameters (information elements in hash-1), a MN 50's CGA can be validated with a single hash operation and the message can be validated through the HMAC signature.

The use of the hash-2 function in the generation of the CGA is referred to as the hash-2 extension technique and its purpose is to increase the computational cost of a brute force attack. Without the hash-2 extension technique, an attacker could perform a brute force attack on the modifier to match a target's CGA and steal the target's pseudonym. Because 5 bits of the CGA are reserved, an attacker requires a maximum of $2^{59}$ hash operations to spoof a CGA given a known modifier and certificate. The hash extension technique increases the strength against a brute force attack by requiring additional computations to find a modifier that generates the correct number of leading zeros. The strength of the CGA is directly related to the value of SEC. That is, increasing SEC increases the computational cost to generate CGA. Consequently, the number of required hash operations is increased by a factor of $2^{16*SEC}$, which increases the number of computations for a successful brute force attack from $2^{59}$ to $2^{59+16*SEC}$. Table 1 below provides computational time for a brute force attack for SEC values from 1 to 3.

TABLE 1

| Computation time of CGA (on an AMD64 processor) | | | |
|---|---|---|---|
| SEC value | 1 | 2 | 3 |
| Required Time | 0.2 sec | 3.2 hrs | 24 yrs |

CGA provides sender invariance in which participants that initially share no relationships at all can authenticate messages once the link between the CGA and its public key has been acknowledged by the other parties. However, any node, including an intruder, can generate a pseudonym (in this case the CGA), which may not be linked to the real identity of the node. This security flaw may lead to a MITM attack. It may be noted, however, that an intruder would not be unsuccessful in signing or decrypting messages belonging to someone else's pseudonym. Sender invariance is therefore weaker than authentication where the real identities between participants are known prior to communicating and do not rely on an initial leap of faith about the pseudonymous identity.

Even with the hash-2 extension, the CGA is susceptible to a time-memory attack. Because hash-2 is computed with invariant elements that are not related to the MN's network attachment, suitable modifiers for a given SEC value can be pre-computed over time. In fact, assuming no hash-1 collision, a table listing at least 259 pre-computed valid modifiers for known public/private key pairs would guarantee an attacker to hit a victim's CGA with 259 hash operations independently of the SEC value, disabling the hash extension security gain. An easy solution would be to include the subnet in both hashes (hash-1 and hash-2), thus greatly complicating the attack by forcing a pre-computed table for each available subnet. However, such approach forces a MN 50 to recompute its hash-2 every time it changes subnet. As shown in Table 1, for SEC=2, it will require a MN 50 to wait several hours before it can attach to the network. In a mobile environment where subnet migration is frequent, this delay is not tolerable.

The CGA is also susceptible to replay attacks. The authentication in CGA relies on the digital signature added at the end of each sent message. However, the fact that the IP header (the source address) is excluded from the signature opens the door to several different types of replay attacks. The easiest one is for an attacker to sniff and store messages of its target while obtaining its modifier and public key. The attacker then changes subnet, regenerates the victim's CGA by recomputing hash-1 with the victim's CGA Parameters, and replays the stored messages with a different source address.

A modified CGA, referred to as CGA++, has been proposed to guard against a time-memory attack by providing authentication in the computation of the CGA. More specifically, CGA++ includes the subnet in the computation of both hash-2 and hash-1. After hash-2 is computed, a signature of the modifier, collision count, and subnet prefix is concatenated with the corresponding public key and then hashed to generate hash-1.

As discussed earlier, including the subnet in hash-2 requires the MN 50 to regenerate its CGA every time it changes subnet, which imposes a prohibitive delay in a mobile environment. On the other hand, the increased cost may not improve security for a large number of MNs 50. In theory, including the subnet in the hash-2 computation would require an attacker to generate $2^{64}$ tables to cover all possible subnets in IPv6. In practice, subnets are statically configured and remain unchanged once they have been assigned to the operator by IANA. Thus, there is a high risk that subnets used by major network operators who have a large proportion of customers are targeted first by attackers. By focusing on the most popular subnets, the number of required pre-computed tables is greatly reduced while the number of potential victims remains large.

As an alternative to certificate-based RO (e.g., CBU and HCBU), RFC 4866 proposes enhanced route optimization based on CGAs. In this solution, the MN 50 uses its public/private key pair in order to generate a permanent CGHoA (Cryptographically Generated Home Address) to prevent HoA impersonation by providing a proof of the private key ownership. Typically, a HMAC signed with the MN's private key fills the purpose of providing integrity and authentication of the message. Therefore, compared to the original RR, even if an attacker intercepts the home keygen token, it must also spoof the victim's CGA which undeniably adds a layer of security.

The RFC also proposes more optimized ways to reduce latency by introducing semi-permanent security associations (SAs) and credit-based authorization. The former mechanism establishes a renewable permanent shared secret (symmetric) token (known as the permanent home keygen token) between the MN 50 and the CN 60 to avoid using resources validating the computationally expensive CGHoA (asymmetric) for future BUs. It should be noted that the first BU sent to the CN 60 must use the MN's signature to prevent an attacker that intercepted a HoT from forging a BU.

The credit-based authorization allows the CN 60 to send packets to a non-tested MN's CoA (unverified state) until no more credits for the MN 50 are available. Credits are added when payload packets from the MN's CoA are received by the CN 60 while being in VERIFIED state. This procedure enables the MN 50 to trigger the early BU technique (after a handover) in which the flow is redirected to the new CoA, while the MN's reachability at the new CoA is verified concurrently. The CN 60 moves the CoA to VERIFIED state once reachability verification completes.

Enhanced route optimization adds the sender invariance property to the BU in the RR procedure. However, an intruder can achieve a MITM attack by intercepting the initial signaling messages from a MN 50, exchanging with the MN's destination using the attackers own generated CGHoA and responding back to the MN 50. Because the MN 50 ignores the true identity of the CN 60, it will validate the attacker's responses.

Also, enhanced route optimization offers no way for the CN 60 to verify the ownership of the MN's CoA other than using the CoT, the main purpose of which is to test the CoA reachability. Therefore, a malicious but legitimate MN 50 could redirect flows to any IP by spoofing the CoA. The credit-based authorization mitigates the effects, but can be problematic when a legitimate MN 50 is unable to perform the reachability test in time because of a temporary problem (handover delay, congestion, interference, etc.) and sees its data flow cut off. Also, as with any reputation/credit based system, the spread between the thresholds can always be exploited by an attacker who well behaves to gain credits and then spends them on flooding a victim by spoofing an IP when sending a BU. By coordinating this attack with multiple other malicious and colluding nodes or zombies with valid CGAs, a distributed denial of service (DDoS) could easily target any victim's IP. A proactive solution that prevents CoA spoofing rather than a reactive one that simply mitigates its effect would be preferred. Additionally, operators might be reluctant to use a protocol with such high signaling overhead in a radio access network.

Flush Request

W. Haddad, M. Naslund, On Using 'Symbiotic Relationship' to Repel Network Flooding Attack, IETF-DRAFT, draft-haddad-mipshop-netflood-defense-03, 2009 proposes a simple solution to repel network flooding aimed at a malicious MN 50 who, after initiating an exchange with the CN 60, detaches itself from the visited network but keeps regularly sending ACK to the CN 60 to keep alive the flow. To achieve this, the authors first assume that a "symbiotic" relationship exists between the MN 50 and the network it resides in by means of CGA and secure network discovery (SeND) protocol. When the advertising router (AR) detects that the MN 50 is not present anymore in its network, it may immediately, or after a timeout, send a signed Flush Request (FR) with a "proof of relationship" (POR) to the CN 60 that keeps sending messages to the disconnected MN 50. Note that the POR is not defined in the document and limits the definition to a concept.

Domain Name System Security Extensions (DNSSEC)

The Domain Name System Security Extensions (DNSSEC) is a suite of Internet Engineering Task Force (IETF) specifications providing authentication and integrity in the DNS query responses so that clients can validate them and make sure that they have not been tampered with. Very briefly, DNSSEC works similar to the Public Key Infrastructure. The top layer domain (TLD) is considered as a trust anchor (similar to the Certificate Authority) and uses the Zone Signing Keys (ZSK) and the Key Signing Keys (KSK) to authorize zone changes and delegations. For every DNS response received by a client, a signature is appended which can be validated using a trusted public key (from a trust anchor).

DNSSEC proposes changes to the DNS protocol to tackle the cache poisoning attack where a malicious node responds to a DNS query before the DNS server and claims that the requested full qualified domain name (FQDN) points to a forged IP address. DNSSEC enables authentication of DNS responses through digital signatures and public-key cryptography. A DNS server authoritative in a domain is trusted through a chain of trusts leading to a set of known and trusted DNS root zones. The deployment of DNSSEC at the DNS root was implemented on Jul. 15, 2010. While the .org top-level domain already offers DNSSEC, a full deployment is expected to be completed by the end of 2011.

Secure Route Optimization

One aspect of the present invention is to provide a more secure route optimization (RO) procedure for MIPv6. The secure RO procedure incorporates enhanced cryptographically generated addresses (ECGAs) and DNSSEC to provide a more secure and efficient mechanism to protect signaling messages, such as the binding update (BU), in untrusted networks between a MN 50 and a CN 60 while at the same time reducing signaling overhead. The RO procedure is designed to be as secure as alternate solutions, such as BU and HCBU, while relying on realistic assumptions and solutions that are either existing or near to being deployed. By validating CGAs (pseudonyms) through the use of DNSSEC and trusted domains managed by trusted third parties, the secure route optimization procedure provides authentication globally, rather than relying on sender invariance. The secure RO procedure also provides more flexibility and control to mobile service providers.

The secure RO procedure and related procedures incorporate one or more of the following aspects of the invention:
1) use of a backward key chain in the generation of CGAs to prevent time memory attacks;
2) use of cascaded or logically-linked CGAs by the MN 50;
3) use of signatures from the HA 22 and VHA 32 to prove that the HoA and CoA are valid addresses in the home and visited networks 20, 30 respectively;
4) use of a trusted DNS server 70 to validate the domains associated with the CGAs; and
5) use of a shared secret between the MN 50 and HA 22 to authenticate the MN 50;
6) use of an authentication token assigned by the MN 50, HA 22, and VHA 32 to authenticate the MN 50 to the CN 60.

These aspects of the invention are described in more detail below.

Backward Key Chain for Enhanced CGA (ECGA)

The ECGA offers support to bind multiple logically-linked CGAs together for authentication and incorporates a built-in backward key chain to prevent time-memory attacks. ECGA enhances reliability while facing the time-memory tradeoff attacks and remaining efficient.

Figure 7:
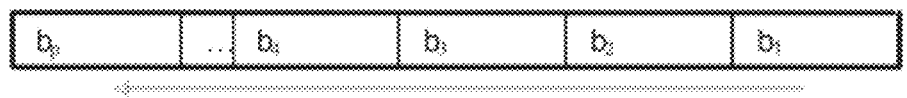
FIG. 7 illustrates a backward key chain used in the generation of an enhanced cryptographically generated address (CGA).

With ECGA, construction of a CGA begins with the generation of a backward key chain. A backward key chain of length $p \in N$, as shown in FIG. 7, is constructed by recursively applying a hash function H repeatedly on an initial secret key s. Exemplary hash functions H include MD1 and SHA-1. The generation of the backward key chain is given by:

$$H^p(s), H^{p-1}(s), \ldots, b_i, \ldots, H(s) \qquad \text{Eq. 3}$$

where $b_i = H(b_{i-1}) = H^i(s)$ and $1 \leq i \leq p \forall i, p \in N$. It is important to note that while the backward key chain is constructed from right to left, the keys are meant to be used from left to right to provide authentication. In fact, any node intercepting $b_i$ can generate $b_j$ for $i <= j < p$ (the left part of the chain) by applying the hash function repeatedly, but, it is computationally infeasible to find the right part $b_j$, for $1 <= j < i$, where $i <= p$, $i, j, p \in N$. For example, given a party that previously received a backward key $b_i$, it authenticates a message signed with $b_j$, for $j < i$, if $H^x(b_j) = b_i$, for all $X, i, j \in N$. No other node could have found $b_i$ prior to its disclosure because $H^{-X}(b_j)$ is very complex to compute.

Once the backward key chain is constructed, hash-2 and hash-1 are generated as follows:

$$\text{hash-2} = H([\text{modifier}, b_i, \text{public\_key}]) \qquad \text{Eq. 4}$$

$$\text{hash-1} = H([\text{modifier}, b_i, \text{subnet}, \text{collision\_count}, \text{public\_key}]) \qquad \text{Eq. 5}$$

The MD1 or SHA-1 hash functions could be used to generate hash-2 and hash-1. As soon as a valid modifier in hash-2 (using $b_i$ rather than the subnet) has been found, the MN 50 may start to compute the next modifier in hash-2 using the following backward key $b_j$ from the chain, where $j<i$, for all $i, j \in N$. Once the new modifier has been found for $b_j$, both parameters are used to generate the next CGA and $b_i$ is removed from the chain if it is not used by any of its addresses. The operation is then repeated with the next backward key, and so on. This process removes the need for a node to know the subnet it is going to attach to before executing the hash extension technique.

Figure 8:
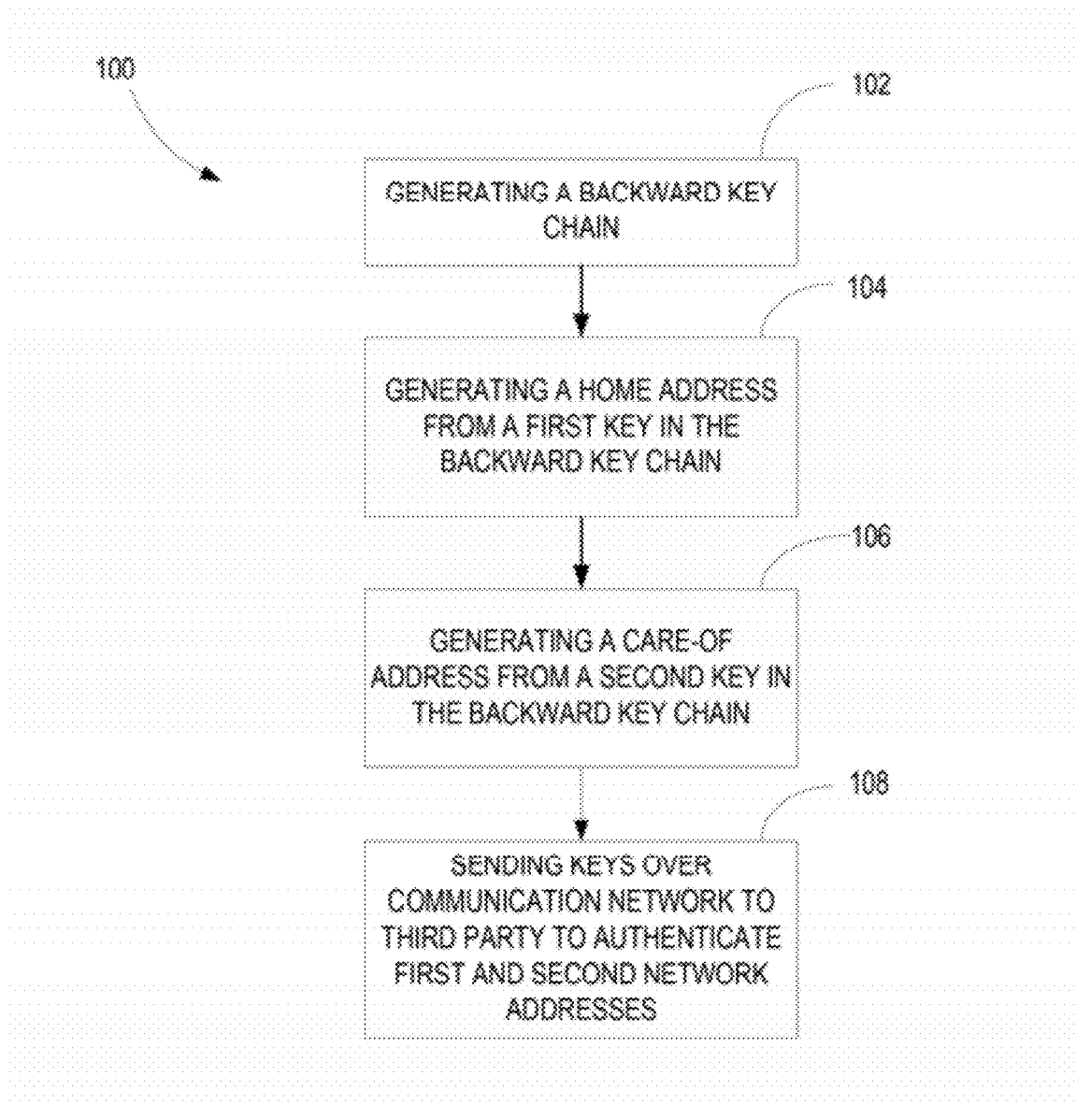
FIG. 8 illustrates an exemplary procedure implemented by a mobile node for generating a CGA using a backward key chain.

FIG. 8 illustrates an exemplary procedure 100 for generating network addresses using a backward key chain. The procedure 100 may be used, for example, by an MN 50 to generate its Cryptographically Generated Home Address (CGHoA) and Cryptographically Generated Care-of-Address (CGCoA). The MN 50 begins by generating a backward key chain 102 as shown in FIG. 7. The backward key chain may be generated as previously described by recursively hashing a secret key according to Eq. 3. Once the backward key chain is generated, the MN 50 generates a first network address from a first key in the backward key chain (block 104) and a second network address from a second key in the backward key chain that precedes the first key (block 106). The MN 50 then uses the first and second network addresses for communications over a communication network (block 108).

As one example, the first network address may be used as the MN's CGHoA for use when the MN 50 is in a home network 20, and the second network address may be used as the MN's CGCoA when the MN 50 is in a visited network 30. The use of the backward key chain in the generation of CGHoA and CGCoA makes it more difficult for a malicious third party to spoof the CGCoA of the MN 50 by providing a mechanism by which a trusted authority or other third party can validate the CGCoA. More particularly, the MN 50 can provide the first key to a trusted authority. A useful property of the backward key chain is that an earlier-generated key can be used to verify a subsequently generated key. However, the subsequently-generated key cannot be used to discover an earlier-generated key. When the MN 50 generates the second address, the trusted authority or other third party can verify that the second key used in the generation of the second network address belongs to the same backward key chain as the first key by hashing the second key and comparing the results to the first key received from the MN 50.

In addition to stopping the time-memory attacks, the backward key chain also provides a means for authenticating CGAs generated by the same entity. For example, the MN 50 may use a first key, denoted $b_i$, to generate its CGHoA and a second key, denoted $b_j$, in the same backward key chain to generate CGCoA where the key $b_j$, precedes the key $b_i$. A third party (e.g., HA 22) can prove that the CGHoA and CGCoA are generated from the same backward key chain by hashing $b_j$, one or more times and comparing the results to $b_i$.

Figure 9:
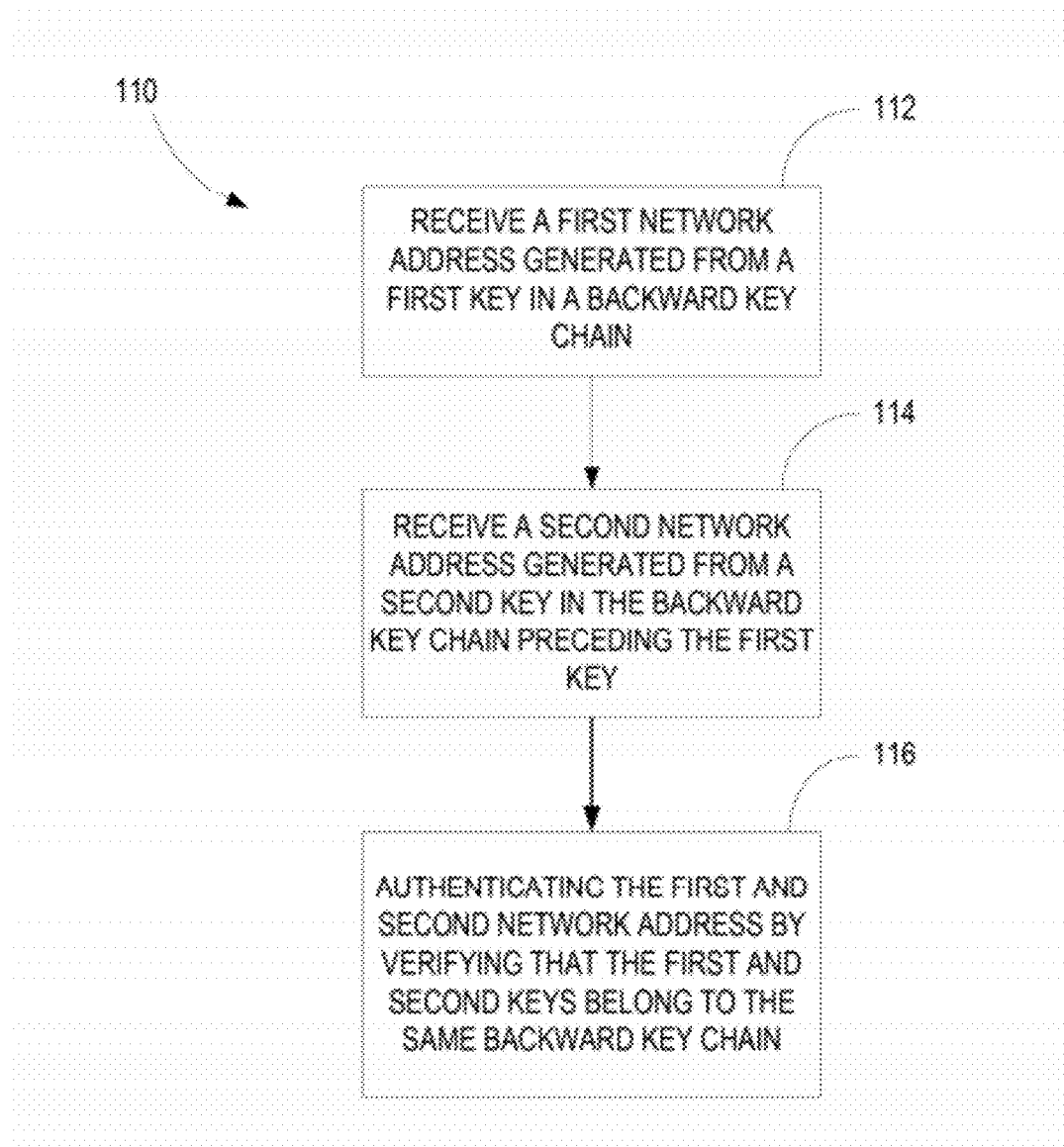
FIG. 9 illustrates an exemplary procedure for using keys in a backward key chain to authenticate CGAs for a mobile node.

FIG. 9 illustrates an exemplary address authentication procedure 110 using a backward key chain to authenticate network addresses. The address authentication procedure 110 may be implemented by an HA 22 to authenticate the CGHoA and CGCoA of an MN 50. The procedure begins when the trusted authority (e.g., HA 22) receives a first network address generated from a first key in a backward key chain (block 112). The trusted authority may later receive a second network address for the same MN 50 generated from a second key in the backward key chain that precedes the first key (block 114). As one example, an HA 22 acting as a trusted authority may receive a CGHoA (first network address) from the MN 50 during a home network attachment procedure and later receive a CGCoA (second network address) from the same MN 50 in a binding update when the MN 50 attaches to a visiting network 30. The trust authority authenticates the first and second network addresses by verifying that the first and second keys belong to the same backward key chain (block 116).

Cascading CGAs

CGA offers support to bind multiple CGAs together by cascading them (if they are linked logically) or by adding them independently in the hash-1 computation. To create logically-linked CGAs, the hash-1 computation for the cascaded CGAs is modified to incorporate the logically linked CGA and/or its parameters as follows:

$$\text{hash-1} = H([\text{modifier}, b_i, \text{subnet}, \text{collision\_count}, \text{CGA}, \text{CGA\_parameters}, \text{public\_key}]) \quad \text{Eq. 6}$$

A CGA can also be cascaded from two or more earlier CGAs by computing hash-1 as follows:

$$\text{hash-1} = H([\text{modifier}, b_i, \text{subnet}, \text{collision\_count}, \text{CGA1}, \text{CGA1\_parameters}, \text{CGA2}, \text{CGA2\_parameters}, \text{public\_key}]) \quad \text{Eq. 7}$$

Table 2 presents an example of CGA generation using the cascading technique:

TABLE 2

Example of Cascading CGAs

| CGA | Hash-1 |
|---|---|
| CGA1 | H([modifier1 $b_i$1 subnet Collision_Count publicKey1]) |
| CGA2 | H([modifier2 $b_i$2 subnet CGA1 Collision_Count CGA1_Parameters publicKey2]) |
| CGA3 | H([modifier3 $b_i$3 subnet CGA2 Collision_Count CGA2_Parameters publicKey3]) |

As seen in Table 2, CGA3 incorporates CGA2 into its hash-1 computation, which itself incorporates CGA1, logically binding all three CGAs. In this example, the CGA2 parameters include CGA1 and its parameters. Similarly, the CGA3 parameters include CGA2 and its parameters. It may be noted that the CGA2 parameters include CGA1 and CGA1 Parameters. By obtaining the CGA parameters for the last CGA in a chain, a third party can authenticate the entire chain of CGAs as will be described in more detail below.

Logically-linked CGAs using the cascading techniques provide greater security compared to CGAs. The inclusion of a backward key in the hash-2 computation provides weak authentication and precludes the use of pre-computed hash-2 tables, thus eliminating the time-memory tradeoff attack. Moreover, ECGAs avoid delays by enabling a node to precompute hash-2 before knowing the subnet it is going to attach to. Therefore, it is possible to dynamically adjust the SEC parameter according to the rate of generation of new CGAs (which is linked to MN's mobility), the average available processing power, and remaining energy. From a security standpoint, a higher value of SEC is always preferred, but the more processing power, energy consumption, and computation time is required.

Logically-linked CGAs are especially useful for binding the MN's HoA and CoA addresses. As will be hereinafter described, CGAs may be used by a MN 50 to generate its CGHoA and CGCoA. The CGCoA may be discarded and regenerated periodically to help avoid replay attacks. Therefore, even if an attacker uses the CGCoA Parameters in a new subnet, the CGCoA of the MN 50 will change and the signatures or authentication token will become invalid.

Figure 10:
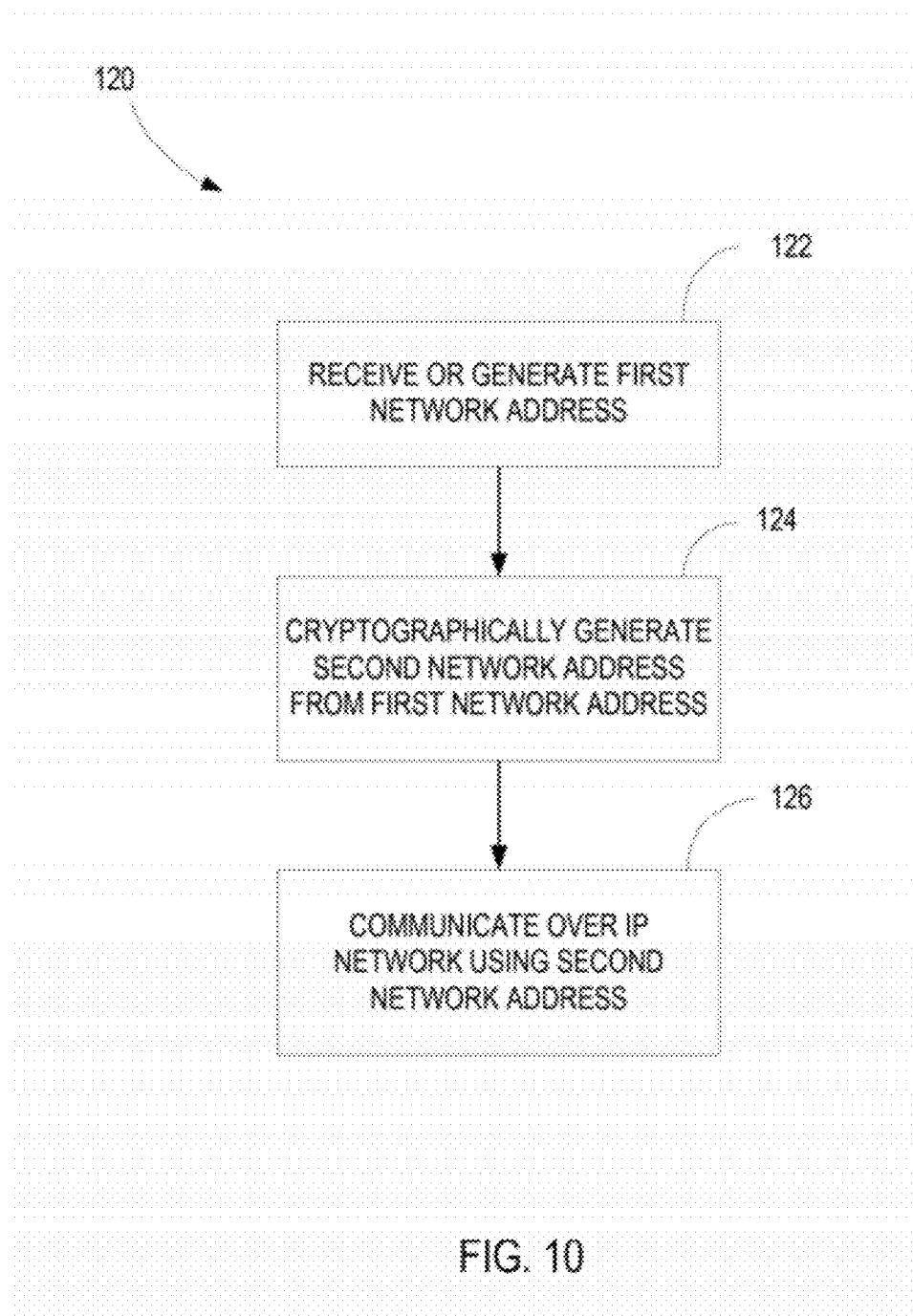
FIG. 10 illustrates an exemplary procedure implemented by a mobile node for generating cascading CGAs.

FIG. 10 illustrates an exemplary address generation procedure 120 executed by an MN 50 for generating cascaded CGAs. The procedure may be used, for example, to generate the CGHoA or CGCoA of the MN 50. The MN 50 receives or generates a first network address (block 122). The first network address, for example, may comprise a Cryptographically Generated Home Agent Address (CGHA) provided by the HA 22 or a Cryptographically Generated Visited Home Agent Address (CGVHA) provided by the VHA 32. As will be hereinafter described, the CGHA or CGVHA may be received in a router advertisement message. In other instances, the first network address may comprise a home address (CGHoA) or care-of address (CGCoA) of the MN 50.

Regardless of the source of the first network address, the MN 50 cryptographically generates a second network address from the first network address so as to logically bind the first and second network addresses (block 124). The second network address is generated using the hash-1 computation according to Eq. 6 or 7 as previously described. The logical binding in this case results from the execution of a hash on the first network address with other information in the hash-1 computation. The second network address may, for example, comprise the CGHoA of the MN 50 generated from the CGHA of the HA 22, the CGCoA of the MN 50 generated from the CGVHA of the VHA 32. Also, the CGCoA of the MN 50 can be generated from the CGHoA of the MN 50. It will also be readily apparent that the logical binding technique can be used to bind the CGCoA to both the CGHoA and CGVHA as shown in Eq. 7. It will also be apparent that a chain of logically bound addresses can be generated. For example, CGCoA can be generated from CGHoA, which itself is generated from and logically bound to CGHA. As will be described in more detail below, this logical binding facilitates authentication of the second network address to prevent spoofing.

Once the second network address is generated, the second network address can then be used by the MN 50 to communicate with a remote node to send user data or signaling messages (block 126). For example, the MN 50 may use the second network address as a CGHoA or CGCoA when communicating with a CN 60, or when sending signaling messages to a HA 22, VHA 32, or CN 60.

Authentication of ECGAs with Signatures

To tackle replay attacks, a signature or authentication token can be used to authenticate CGAs to a third party. A trusted agent can be used to provide a signature to authenticate cascaded CGAs to a third party. More particularly, the trusted agent may validate the cascaded CGAs and generate a signature that may be presented to a third party for verification of the CGAs. Table 3 below shows signatures for authenticating the CGAs shown in Table 2.

TABLE 3

Signatures For Authenticating CGAs

| CGA | Signature |
|---|---|
| $CS_{CGA1-CGA2}$ | $\{H([CGA2\ CGA2\_Parameters])\}_{PKTA1}$ |
| $CS_{CGA2-CGA3}$ | $\{H([CGA3\ CGA3\_Parameters])\}_{PKTA2}$ |
| Auth Token | $\{\{\{H([CN\ CGA3\ CGA3\_Parameters])\}_{PKMN}\}_{PKHA}\}_{PKVHA}$ |

The signature $CS_{CGA1-CGA2}$ comprises a hash of CGA2 and its parameters signed with the private key of the trusted agent (PKTA). The signature $CS_{CGA2-CGA3}$ comprises a hash of CGA3 and its parameters signed with the private key of the same or different trusted agent (PKTA). As noted before, the CGA3 Parameters include CGA2 and its Parameters, which include CGA1 and its parameters.

Table 3 also provides an example of an authentication token for authenticating a cascaded CGA to the CN 60. Referring to the example CGAs shown in Table 2, an authentication token validating CGA3 should contain proof of all the nodes involved in the computation of the CGAs, such as a HMAC signed in the reverse order with the private keys of all three nodes involved: $\{\{\{HMAC\}_{PKN3}\}_{PKN2}\}_{PKN1}$. However, it may be that node 3 is not known to node 1 and thus cannot authenticate it. In that case, the HMAC can be signed in the forward order. Because any node could intercept and sign $\{\{HMAC\}_{PK1}\}_{PK2}$ to pretend that nodes 1 and 2 approved CGA3, HMAC must contain information specific to node 3. This technique should therefore be used carefully.

When node 3 is bound to nodes 1 and 2 but nodes 1 and 2 are not bound together, the inclusion method shown in Eq. 7 can be used by adding the CGA of nodes 1 and 2 in the computation of hash-1 for the CGA of node 3. Again, the signature or authentication token for authenticating CGA3 is expected to contain a proof of all three nodes, but because nodes 1 and 2 are not logically bound, node 3 may provide two signatures, one showing the relation between nodes 1 and 3, and the other between nodes 2 and 3: $\{\{HMAC\}_{PKN2}\}_{PKN1}$ and $\{\{HMAC\}_{PKN3}\}_{PKN2}$.

Figure 11:
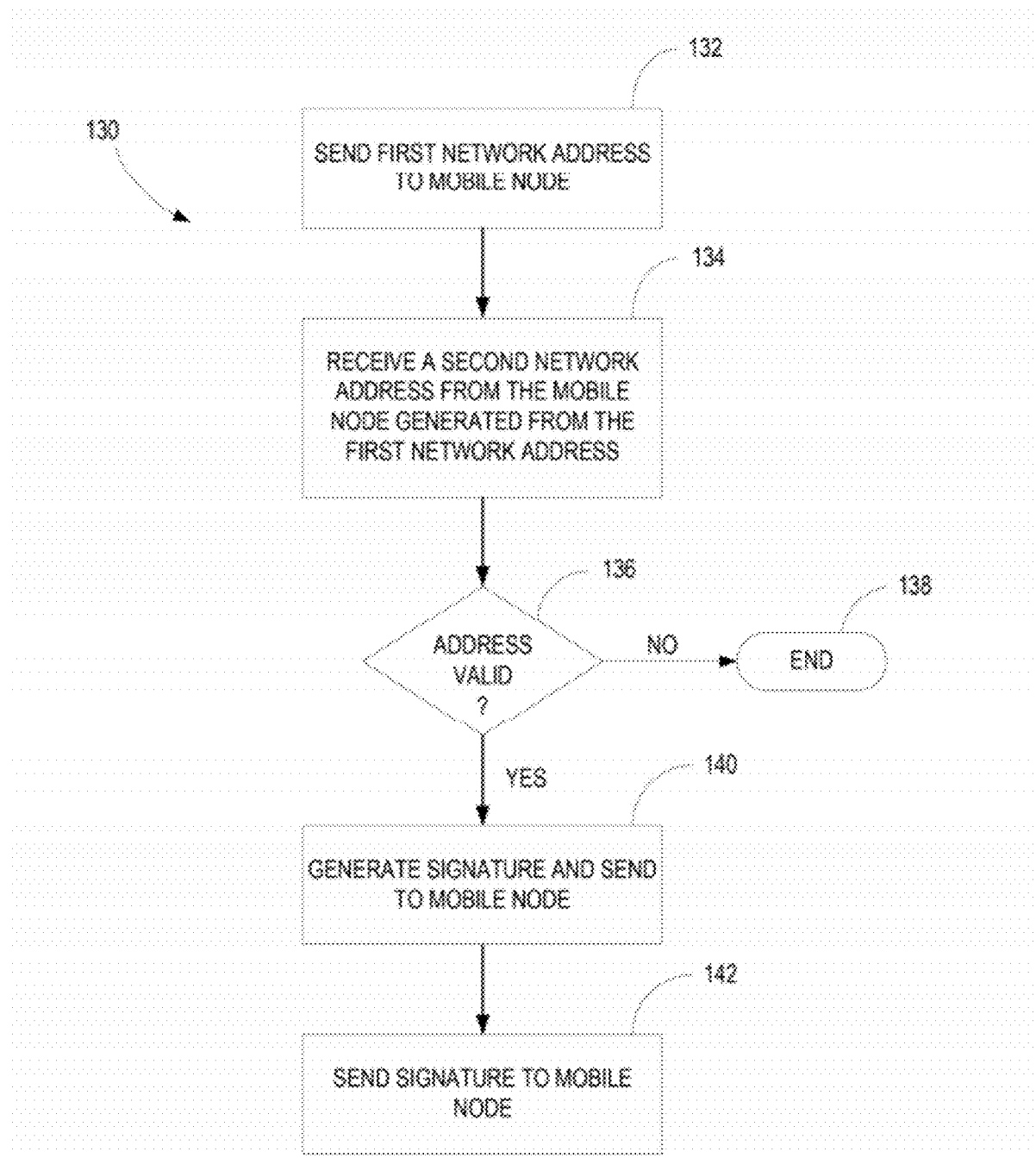
FIG. 11 illustrates an exemplary signature procedure implemented in a home or visited network for generating a signature to authenticate CGAs of a mobile node to a third party.

FIG. 11 illustrates an exemplary signature procedure 130 implemented in a home or visited network for issuing signatures to authenticate a CGA logically-linked with the CGHA or CGVHA. This procedure may be used, for example, to provide a signature for authenticating the CGHoA or CGCoA of the MN 50 to third parties. The signature procedure can be performed, for example, when the MN 50 attaches to either the home network 20 or visited network 30. The home or visited network 20, 30 sends a first network address to the MN 50 (block 132). The first network address may comprise, for example, the CGHA of the HA 22 or CGVHA of the VHA 32. The first network address may be sent in a router advertisement as will be hereinafter described. The MN 50 generates a second network address from the first network address as shown in FIG. 8. The second network address may comprise the CGHoA or CGCoA of the MN 50. When the HA 22 or VHA 32 receives the second network address from the MN 50 (block 134), the HA 22 or VHA 32 validates the second network address (block 136). If the authentication fails, the home agent terminates the procedure (block 138). If the validation is successful, the HA 22 or VHA 32 generates a cryptographic signature ($CS_{HoA-HA}$) (block 140) and sends it to the MN 50 (block 142).

Using DNSSEC for Authentication of Domains

One aspect of the invention is relying on a trusted DNS server 70 to provide authentication of domains instead of maintaining lists of trusted IP addresses. IP addresses can change frequently and, thus, generate a lot of signaling in order to maintain an IP address list. On the other hand, domains typically remain static for long periods of time.

Figure 12:
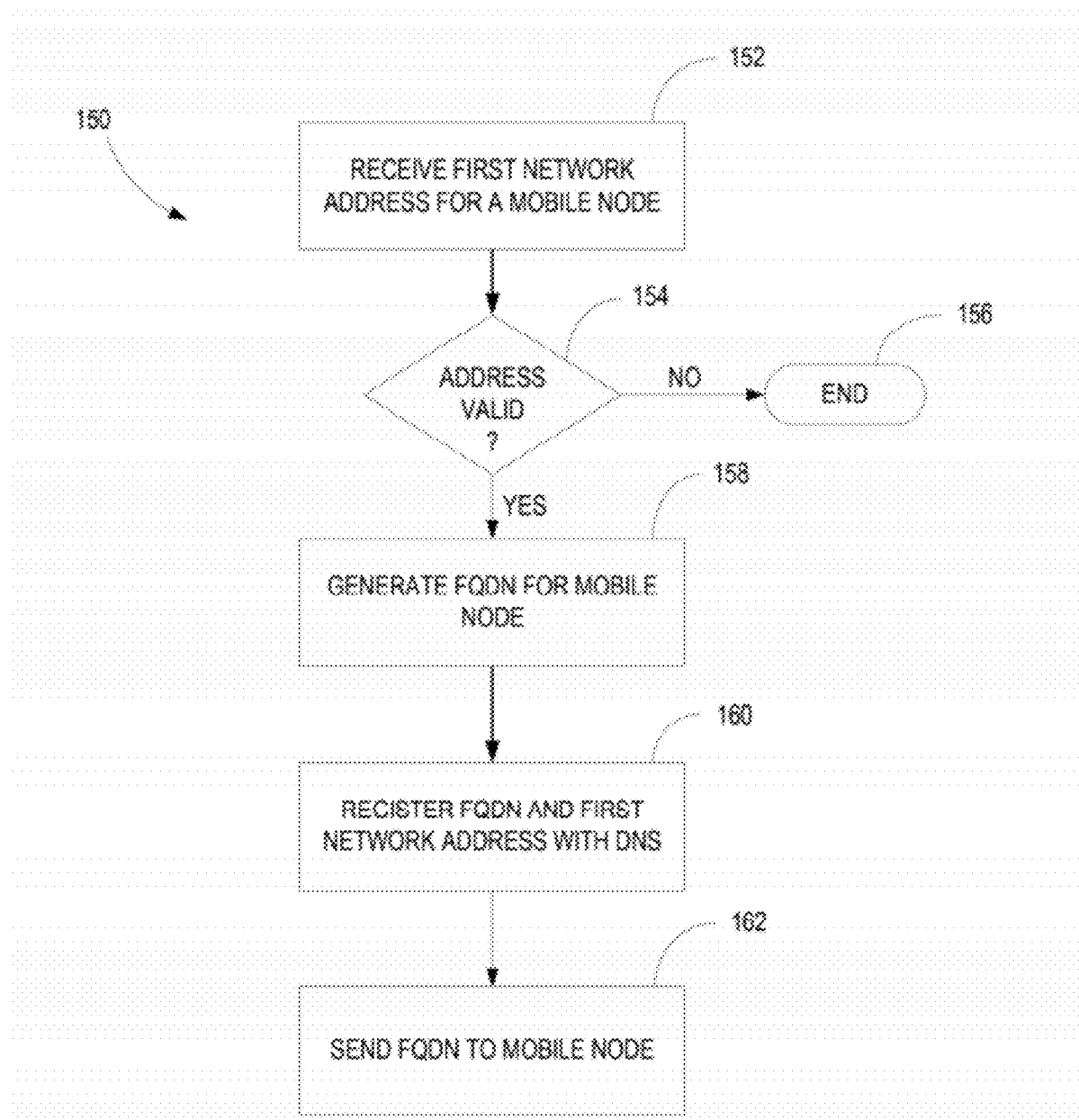
FIG. 12 illustrates an exemplary registration procedure implemented in a home or visited network for registered a CGA along with a fully-qualified domain name with a trusted domain name server.

FIG. 12 illustrates an exemplary registration procedure 140 implemented in a home or visited network 20, 30 for registering a CGA of an MN 50 with a trusted DNS 70. The registration procedure 150 may be performed, for example, when the MN 50 attaches to either the home network 20 or visited network 30. When the HA 22 or VHA 32 receives the first network address from the mobile node (block 152), it validates the address (block 154). As previously noted, the network address may comprise a CGHoA generated from the CGHA of the HA 22, or a CGCoA generated from the CGVHA of the VHA 32. If the validation is unsuccessful, the procedure ends (block 156). If the validation is successful, the VA 22 or VHA 32 generates a fully qualified domain name (FQDN) for the MN 50 (block 158), registers the FQDN and network address provided by the MN 50 with a DNS 70 (block 160), and sends the FQDN to the MN 50 (block 162). The registration procedure 150 may be combined with the signature procedure shown in FIG. 11 as will be hereinafter described in greater detail.

Figure 13:
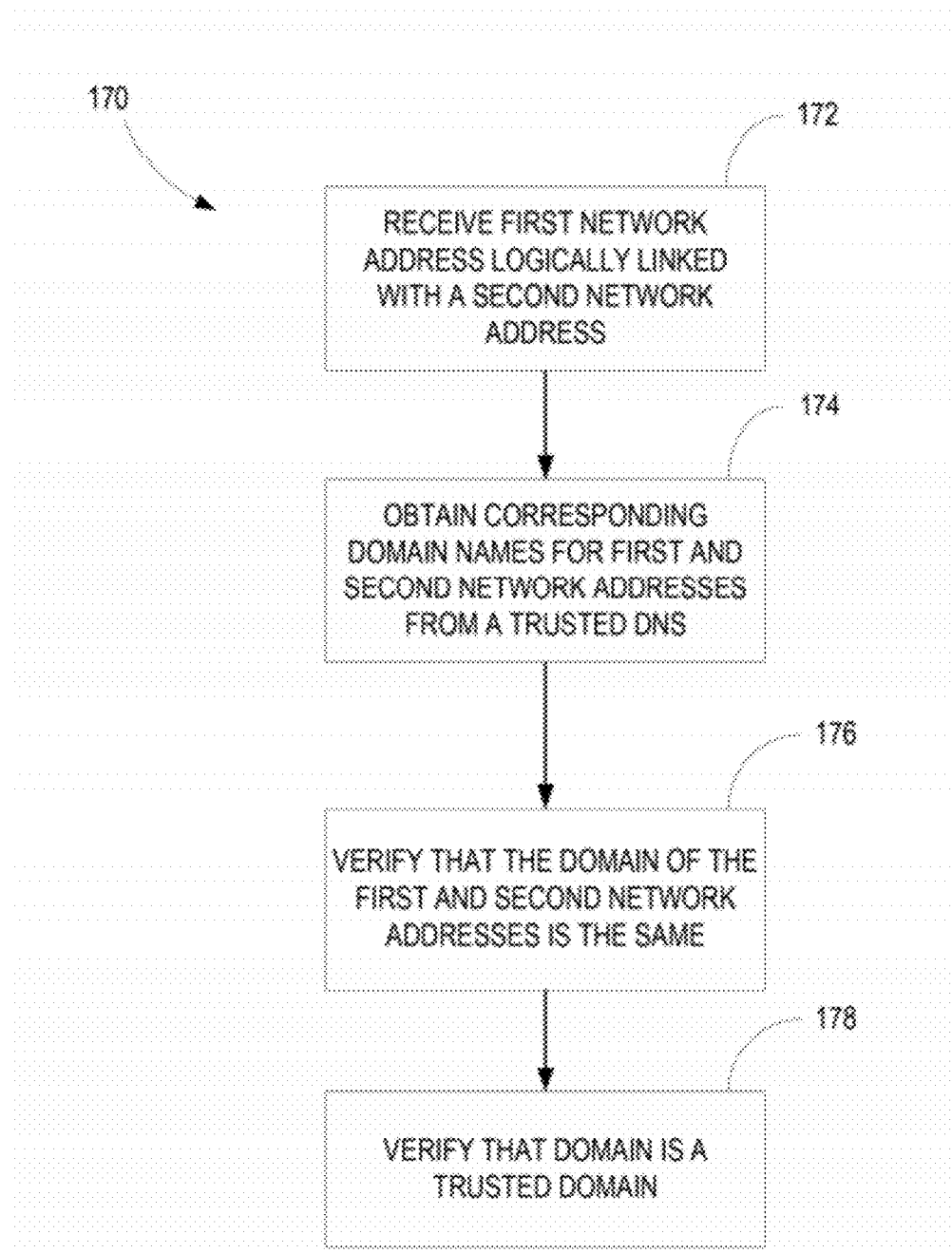
FIG. 13 illustrates an exemplary authentication procedure for authenticating the domain of CGAs provided by a mobile node.

FIG. 13 illustrates an exemplary procedure 170 for authenticating the domain of network addresses provided by an MN 50. The domain authentication procedure may be implemented in either a home network 20 or visited network 30. The procedure 170 begins when the HA 22 or VHA 32 receives from the MN 50 a first network address that is logically linked with a second network address (block 172). The second network address may have been previously received or may be received with the first network address. The first network address may, for example, comprise the CGHoA or CGCoA of the MN 50, while the second network address comprises the CGHA of the HA 22 or CGVHA of the VHA 32. After receiving the first network address, the HA 22 or VHA 32 obtains from a trusted DNS 70 corresponding domain names for the first and second network addresses (block 174) and verifies that the domains associated with the first and second network addresses are the same (block 176). Additionally, the domain may optionally be verified as a trusted domain by comparing the domain returned by the DNS 70 to a "quiet list" of trusted domains (block 178). As will be hereinafter described, the domain authentication procedure 170 may be performed by a visited network 30 when the MN 50 attaches to the visiting network 30, by a HA 22 in a home network 20 when the MN 50 sends a binding update to the HA 22, and by a CN 60 when the MN 50 executes a route optimization procedure.

FIGS. 14-17 illustrate how the basic procedures shown in FIGS. 8-13 may be used to provide mechanisms for secure route optimization. When a MN 50 first boots, it starts by constructing a backward key chain as previously described. The backward key chain is used to generate the CGHoA and CGCoA of the MN 50. The backward key chain should be long enough to support the creation of many CGCoAs to avoid refreshing its CGHoA too often. Table 4 shows how CGAs are generated in the context of MIPv6 to provide secure RO.

TABLE 4

CGA for MIPv6

| CGA | Hash-1 |
|---|---|
| CGHA | H([modifierHA subnet Collision_Count publicKeyHA]) |
| CGVHA | H([modifierVHA subnet Collision_Count publicKeyVHA]) |

TABLE 4-continued

CGA for MIPv6

| CGA | Hash-1 |
|---|---|
| CGHoA | H([modifierHoA $b_i$ subnet Collision_Count CGHA CGHA_Parameters publicKeyMN]) |
| CGCoA | H([modifierHoA $b_j$ subnet Collision_Count CGVHA CGVHA_Parameters CGAHoA CGAHoA_Parameters publicKeyMN]) |

Note that $b_i$ and $b_j$ in Table 4 are the backward keys of the MN 50 from the same backward key chain where i<=j<=1 for all i,j in N.

As shown in Table 4, the CGHA and CGVHA for the HA 22 and VHA 32 are generated in a conventional fashion according to Eqs. 1 and 2. The CGHoA and CGCoA of the mobile terminal, in contrast, are generated using the modified hash-1 computation shown by Eqs. 6 and 7, respectively. The hash-1 calculation for the CGHoA and CGCoA incorporates a key selected from the backward key chain and other logically-linked CGAs. For example, the CGHoA as shown in Table 3 is generated using backward key $b_i$, CGHA, and the CGHA Parameters. The CGHA Parameters include the information elements (e.g., modifier, subnet, collision count, and public key) used to generate the CGHA by the HA 22. Similarly, the CGCoA incorporates a backward key $b_j$, CGVHA, the CGVHA Parameters, CGHoA, and the CGHoA Parameters. The backward key $b_j$, is a key to the right of the backward key $b_i$. Thus, a node receiving $b_j$, can compute $b_i$ as hereinafter described. The CGVHA Parameters comprise the information elements for generating the CGVHA, while the CGHoA Parameters, as previously noted, comprise the information elements used to generate the CGHoA. It should be noted that the CGHoA Parameters include CGHA and CGHA Parameters.

The secure RO procedure also makes use of signatures from trusted authorities to validate the various CGAs used in MIPv6. In the secure RO procedure, the HA 22 and VHA 32 each act as a trusted authority. The HA 22 provides a signature for authenticating the CGHoA of the MN 50. Similarly, the VHA 32 provides a signature for authenticating the CGCoA of the MN 50. The secure RO procedure also makes use of an authentication token that is signed with the private key of MN 50, HA 22, and VHA 32. Table 5 below presents the signatures and authentication tokens used in the secure RO procedure.

TABLE 5

Signatures used for secure RO in MIPv6

| CGA | Signature |
|---|---|
| $CS_{HoA-HA}$ | $\{H([CGHoA\ CGHoA\_Parameters])\}_{PKHA}$ |
| $CS_{CoA-VHA}$ | $\{H([CGCoA\ CGCoA\_Parameters])\}_{PKVHA}$ |
| Auth Token | $\{\{\{H([CN\ CGCoA\ CGCoA\_Parameters])\}_{PKMN\}PKHA\}PKVHA}$ |

Figure 14:
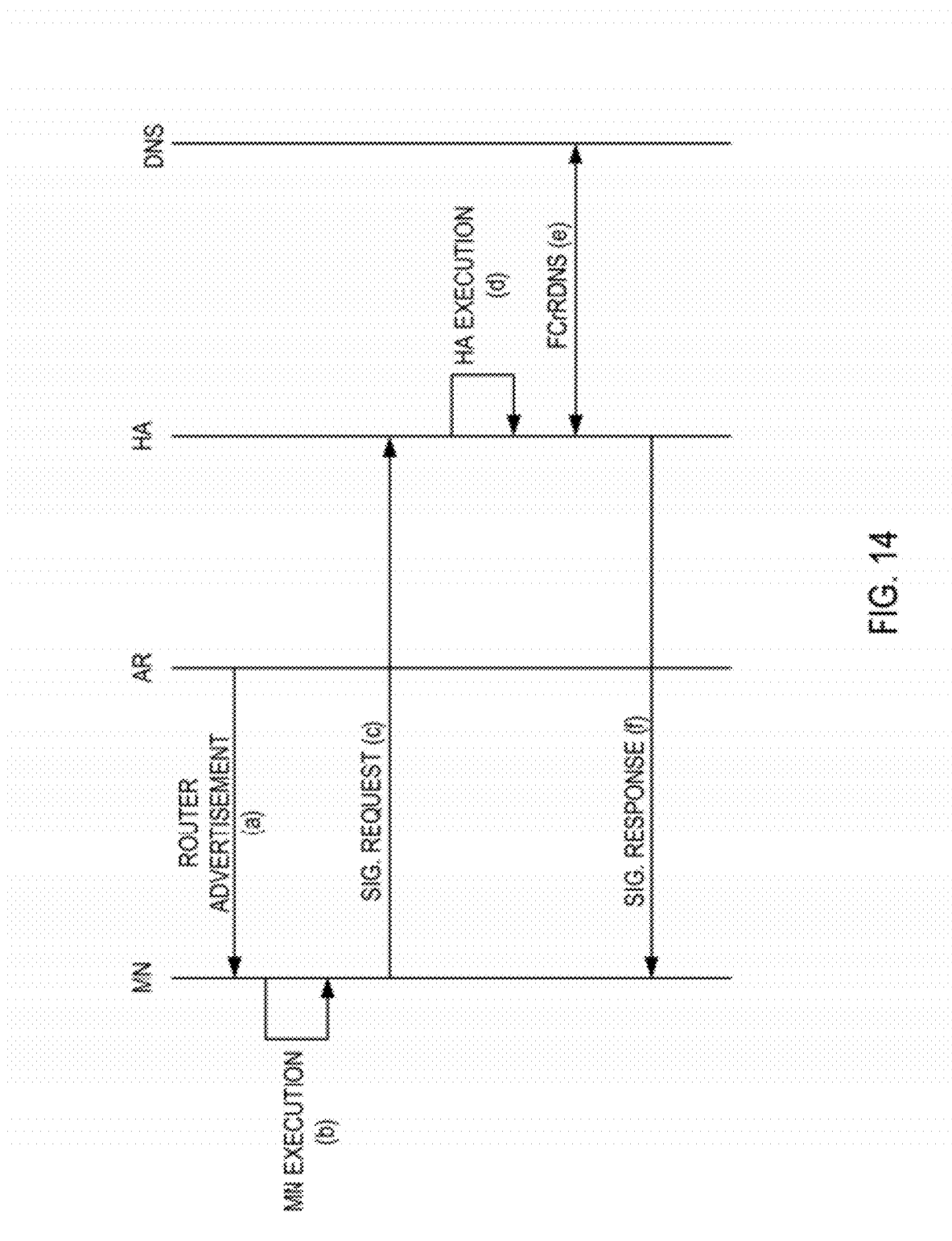
FIG. 14 illustrates an exemplary network attachment procedure using CGAs and a trusted DNS executed when a mobile node attaches to a home network.

FIG. 14 illustrates a home network attachment (boot-strapping) procedure executed by the MN 50 and HA 22 when the MN 50 first attaches to the home network. The home network attachment procedure incorporates the address generation procedure in FIGS. 8 and 10, the signature procedure in FIG. 11, and the registration procedure in FIG. 12. Table 6 summarizes the messages exchanged during the home network attachment procedure.

TABLE 6

Message For Home Network Attachment (Bootstrapping)

| Enitites | Message |
|---|---|
| AR - MN | Router Advertisement(Home subnet.CGHA).CGHA Parameters.$\{HMAC\}_{PKHA}$ |
| MN - HA | Signature Request(CGHoA).CGHA Parameters.$\{HMAC\}_{PSKMNHA}$.$\{HMAC\}_{PKMN}$ |
| HA - DNS | Domain Name Registration (CGHoA, FQDN) |
| HA - MN | Signature Response($CS_{HoA-HA}$. HoA FQDN).CGHA Parameters.$\{HMAC\}_{PKHA}$ |

During the boot-strapping procedure, the MN 50 generates its CGHoA and sends the generated CGHoA to the HA 22 as part of a signature request. The HA 22 validates the CGHoA and provides the MN 50 with the $CS_{HoA-HA}$ signature shown in Table 5. To begin the boot-strapping procedure, the MN 50 receives a router advertisement message from an advertising router (AR) in its home network (step a). The router advertisement message includes the home subnet and CGHA of the HA 22. The CGHA Parameters and message authentication code $\{HMAC\}_{PKHA}$ are received with the router advertisement message. As previously noted, the CGHA Parameters contain the information elements used to generate the CGHA. The router advertisement may also optionally include the security policies regarding the GCHoA, signatures, or other related security parameters used in the home network 20 which must be respected by the MN 50.

When the MN 50 receives the router advertisement, it validates the router advertisement message and, if valid, generates CGHoA (step b) (FIG. 10). The MN 50 performs the following to validate the router advertisement message:
  verify that the home subnet in the router advertisement and the CGHA Parameters is the same;
  use the signed message authentication code appended to the router advertisement to authenticate the HA 22 as the sender of the router advertisement and verify that the HA 22 owns the public key used to generate CGHA;
  use the CGHA Parameters to validate CGHA.

To authenticate HA 22 as the sender of the router advertisement, the MN 50 decrypts the message authentication code using the public key provided in the CGHA Parameters. The MN 50 then generates a hash of the router advertisement message and extension, and compares it to the decrypted message authentication code to prove that HA 22 is the sender and that HA 22 owns the key used to generate CGHA. To validate CGHA, the MN 50 executes the hash-1 function using the CGHA Parameters and compares the results to the supplied CGHA. Provided that the validity checks are passed, the MN 50 then generates CGHoA using CGHA and the CGHA Parameters provided in the router advertisement message.

After generating CGHoA, the MN 50 sends a signature request message to the HA 22 to request a signature that links CGHoA with CGHA (step c). The signature request message includes the CGHoA of the MN 50. The CGHoA Parameters, a first hashed message authentication code $\{HMAC\}_{PKMNHA}$ signed with a secret key shared between the MN 50 and the HA 22, and a second hashed message authentication code $\{HMAC\}_{PKMN}$ signed with the public key of the MN 50 are appended to the signature request message. The CGHoA Parameters include the information elements used to generate the CGHoA, which include the CGHA and CGHA Parameters. The first hashed message authentication code $\{HMAC\}_{PKMNHA}$ is generated by signing a hash of the signature request message and extensions with the secret key shared between the MN 50 and HA 22. The first hashed message authentication code {HMAC}$_{PKMNHA}$ is used to authenticate the MN 50 to the HA 22. The second hashed message authentication code {HMAC}$_{PKMN}$ is generated by signing the hash of the signature request message and extensions signed with the public key of the MN 50. The second hash value proves to the HA 22 that the MN 50 owns the key used to generate CGHoA.

When the HA 22 receives the signature request, it validates the signature request message and, if successful, generates a cryptographic signature, denoted CS$_{HoA-HA}$, binding the addresses CGHoA and CGHA (step d) (FIG. 11). The MN 50 performs the following to validate the signature request message:

use the first message authentication code {HMAC}$_{PKMNHA}$ appended to the signature request message to authenticate the MN 50 as the sender of the signature request message;
    use the second message authentication code {HMAC}$_{PKMN}$ appended to the signature request message to verify that the MN 50 owns the public key used to generate CGHoA;
    use the CGHoA Parameters to validate CGHoA.

To authenticate the MN 50, the HA 22 uses the shared key to decrypt the first message authentication code {HMAC}$_{PKMNHA}$ and compares the results with a computed hash of the signature request and extensions. To verify that the MN 50 owns the public key used to generate CGHoA, the HA 22 uses the public key provided in the CGHoA parameters to decrypt {HMAC}$_{PKMN}$ and compares the results to the hash of the signature request message and extensions. To validate the CGHoA, the HA 22 executes the hash-1 function according to Eq. 4 using the CGHoA Parameters and compares the results with the CGHoA supplied by the MN 50 in the signature request message. If the validity checks are successful, the HA 22 stores the backward key provided in the CGHoA Parameters for future authentication and generates the CS$_{HoA-HA}$ signature as shown in Table 5.

The HA 22 also generates a fully qualified domain name (FQDN) for the MN 50 and registers the FDQN with the associated CGHoA with DNS server 70 (step e) (FIG. 12). More particularly, the HA 22 sends a registration request to the DNS server 70 including the FQDN for the MN 50 and the supplied CGHoA for the MN 50. Both the HA 22 and DNS server 70 are trusted entities, so the registration of the FQDN with the DNS server 70 can be later used for validating signaling messages as hereinafter described.

After registering the domain name of the MN 50 with DNS server 70, the HA 22 sends a signature response message to the MN 50 (step f). The signature response message includes the CS$_{HoA-HA}$ signature and the FQDN linked to the CGHoA. The extensions of the signature response include the CGHA Parameters and a message authentication code {HMAC}$_{PKHA}$ signed with the private key of the HA 22. Upon receipt of the signature response message, the MN 50 validates the message by decrypting the message authentication code with the public key supplied in the CGHA Parameters and compares the results to a computed hash of the signature response message and extensions. When the signature response is validated, the MN 50 stores the CS$_{HoA-HA}$ signature and the FQDN for future use.

Figure 15:
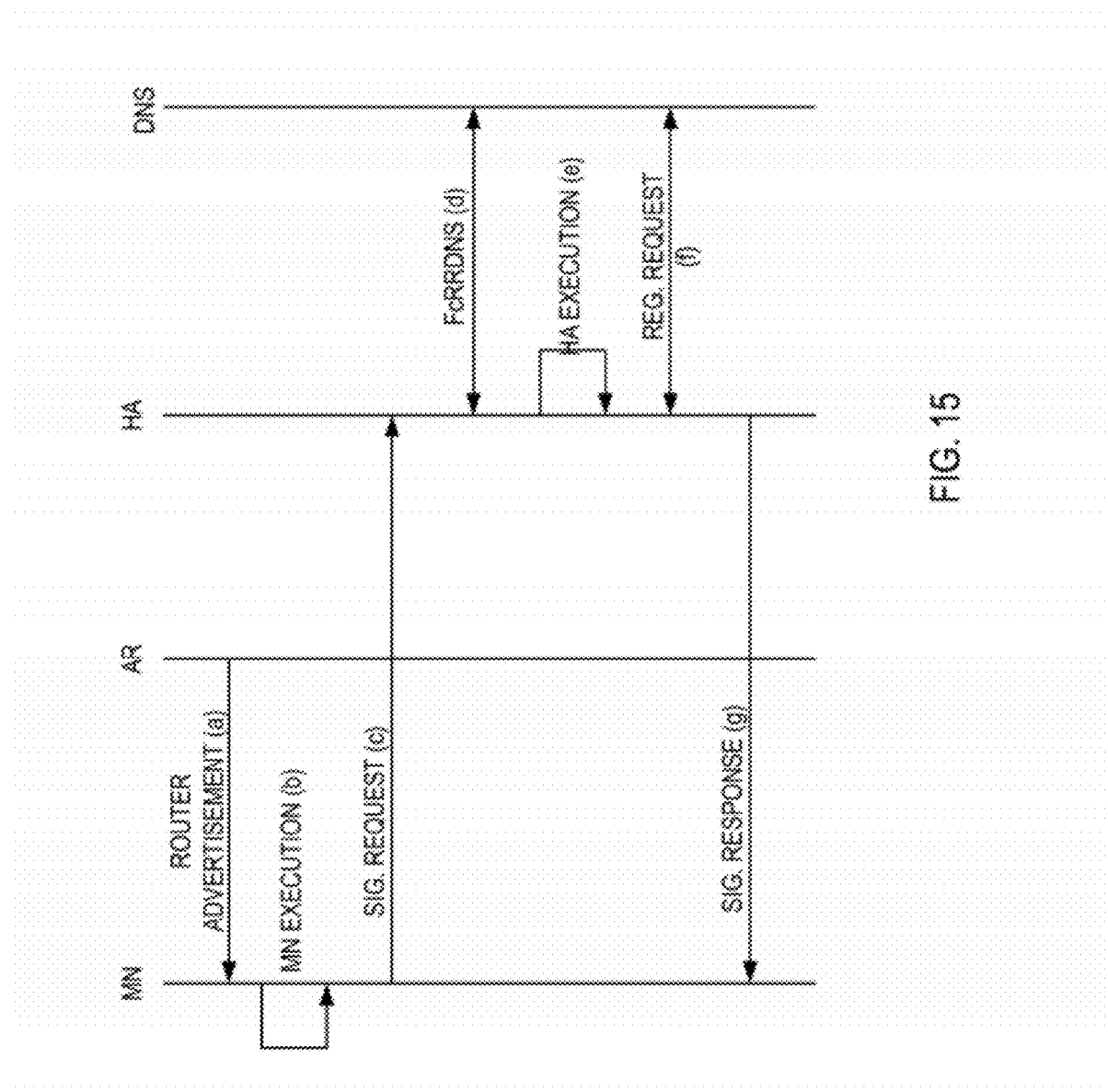
FIG. 15 illustrates an exemplary network attachment procedure using CGAs and a trusted DNS executed when a mobile node attaches to a visited network.

FIG. 15 illustrates an exemplary visited network attachment procedure executed by the MN 50 and VHA 32 when the MN 50 enters a visited network. The visited network attachment procedure shown in FIG. 15 is similar to the home network attachment (bootstrap) procedure shown in FIG. 14. One difference is that the signature request is authenticated through the CS$_{HoA-HA}$ signature rather than a shared secret and the MN 50's public key that is used to generate the CGHoA. The visited network attachment procedure incorporates the address generation procedures in FIGS. 8 and 10, the signature procedure in FIG. 11, the registration procedure in FIG. 12, and the domain authentication procedure shown in FIG. 13. Table 7 summarizes the messages exchanged during the home network attachment procedure.

TABLE 7

Messages For Visited Network Attachment

| Enitites | Message |
| --- | --- |
| AR - MN | Router Advertisement(Visited subnet.CGVHA).CGVHA Parameters.{HMAC}$_{PKVHA}$ |
| MN - VHA | Signature Request(CGCoA. CS$_{HoA-HA}$).CGCoHA Parameters.{HMAC}$_{PKMN}$ |
| VHA - DNS | Forward Confirmed reverse DNS lookup (CGHoA) Forward Confirmed reverse DNS lookup (CGHA) |
| VHA - MN | Signature Response(CS$_{CoA-VHA}$.CoA FQDN).CGVHA Parameters.{HMAC}$_{PKVHA}$ |
| VHA - DNS | Domain Name Registration (CGCoA, FQDN) |

When the MN 50 enters the visited network, the MN 50 receives a router advertisement from an advertising router (AR) in the visited network (step a). The router advertisement message contains the visited subnet and the CGVHA of the VHA 32. The router advertisement message may optionally include the security policies of the visited network. The CGVHA is generated in the same manner as a conventional CGA as shown in Table 4. The router advertisement further has extension fields appended containing the CGVHA Parameters and a hashed message authentication code {HMAC}$_{PKHA}$ signed with the private key of the VHA 32. The hashed message authentication code {HMAC}$_{PKHA}$ is formed by hashing the router advertisement and extension fields and signing the result the HA's private key.

When the MN 50 receives the router advertisement, it validates the router advertisement message and, if valid, generates CGCoA (step b) (FIG. 10). The MN 50 performs the following to validate the router advertisement message:

verify that the home subnet in the router advertisement and the CGVHA Parameters is the same;
    use the signed message authentication code appended to the router advertisement to authenticate the VHA 32 as the sender of the router advertisement and verify that the VHA 32 owns the public key used to generate CGHA;
    use the CGVHA Parameters to validate CGVHA.

To authenticate VHA 32 as the sender of the router advertisement, the MN 50 decrypts the message authentication code using the public key provided in the CGVHA Parameters. The MN 50 then generates a hash of the router advertisement message and extensions, and compares it to the decrypted message authentication code HMAC to prove that VHA 32 is the sender of the message and that VHA 32 owns the public key used to generate CGVHA. To validate CGVHA, the MN 50 executes the hash-1 function on the CGVHA Parameters and compares the results to the supplied CGVHA. Provided that the validity checks are passed, the MN 50 then generates CGCoA using CGHoA, the CGHoA Parameters previously generated by the MN 50, CGVHA, and the CGVHA Parameters provided in the router advertisement message.

Once the CGCoA has been generated by the MN 50, it must be approved by the VHA 32. Thus, the MN 50 sends a signature request to the VHA 32 (step c). The signature request includes the CGCoA generated by the MN 50 and the CS$_{HoA-HA}$ signature provided by the HA 22. Extension fields are appended to the signature request to include the CGCoA Parameters and a hashed message authentication code $\{HMAC\}_{PKMN}$ signed with the private key of the MN 50. The CGCoA Parameters include the information elements used by the MN 50 to generate the CGCoA. These parameters include the CGHoA of the MN 50, the CGHoA Parameters, the CGVHA of the VHA 32, and the CGVHA Parameters. The CGHoA Parameter, in turn, include the CGHA and CGHA Parameters. The signed message authentication code $\{HMAC\}_{PKMN}$ enables the VHA 32 to authenticate the MN 50 as the center of the signature request and verify that the MN 50 owns the key used to generate CGCoA.

When the HA 22 receives the signature request, it uses the hashed message authentication code $\{HMAC\}_{PKMN}$ appended to the signature request message to authenticate the MN 50 as the sender of the signature request message and executes a forward-confirmed reverse DNS (FCrRDNS) on CGHoA and CGHA (step d) (FIG. 13). The DNS server returns the FQDNs associated with CGHoA and CGHA. The VHA 32 then authenticates CGHoA, CGHA, and the $CS_{HoA\text{-}HA}$ and, if successful, generates the $CS_{CoA\text{-}VHA}$ signature as shown in Table 5 (step e). The VHA 32 performs the following to authenticate the signature request message:
confirm that the domains of the CGHoA and CGHA are the same;
checks "white list" to confirm that the domain of CGHoA and CGHA is a trusted domain;
validate CGCoA, CGHoA and CGHA using corresponding CGA Parameters
verify the $CS_{HoA\text{-}HA}$ signature;
To validate the domains of CGHoA and CGHA, the VHA 32 compares the domains associated with CGHA and CGHoA returned by the DNS server 70 to confirm that they are the same and then verifies that the domain is on a "white list" of trusted domains maintained by the VHA 32. The validation of CGCoA, CGHA, and CGHoA is performed as previously described by using the provided CGCoA Parameters, CGHoA Parameters and CGHA Parameters to generate hash-1 and comparing the results to the supplied CGCoA, CGHoA and CGHA. To verify the $CS_{HoA\text{-}HA}$ signature, the VHA 32 executes a hash on the concatenation of CGHoA and CGHA Parameters and compares the results with the decrypted $CS_{HoA\text{-}HA}$ signature. If the authentication is successful, the VHA 32 generates the $CS_{CoA\text{-}VHA}$ signature as shown in Table 5. The $CS_{CoA\text{-}VHA}$ signature comprises a hash of the CGCoA concatenated with the CGCoA Parameters and signed with the private key of the VHA 32. The VHA 32 also generates a FQDN for the MN 50 and links it with the supplied CGCoA.

As previously noted, the VHA 32 acts as a trusted authority and registers the FQDN for the MN 50 in the visited network 30 with the secure DNS server 70 (step f) (FIG. 12). More particularly, the VHA 32 sends a DNS Registration message to the DNS server 70 including the $FQDN_{CoA}$ and CGCoA of the MN 50. Once the $FQDN_{CoA}$ of the MN 50 is registered, the VHA 32 sends a signature response to the MN 50 (step g). The signature response includes the $CS_{CoA\text{-}VHA}$ signature, and the $FQDN_{CoA}$ linked to the CoA. The extension fields to the signature response include the CGVHA Parameters and a message authentication code signed with the private key of the VHA 32 $\{HMAC\}_{PKHA}$. As previously noted, the CGVHA Parameters comprise the information elements used to generate the CGVHA. The signed message authentication code proves that the message originated with the VHA 32. The $CS_{CoA\text{-}VHA}$ signature confirms to a third party that the VHA 32 approved the CGCoA.

Figure 16:
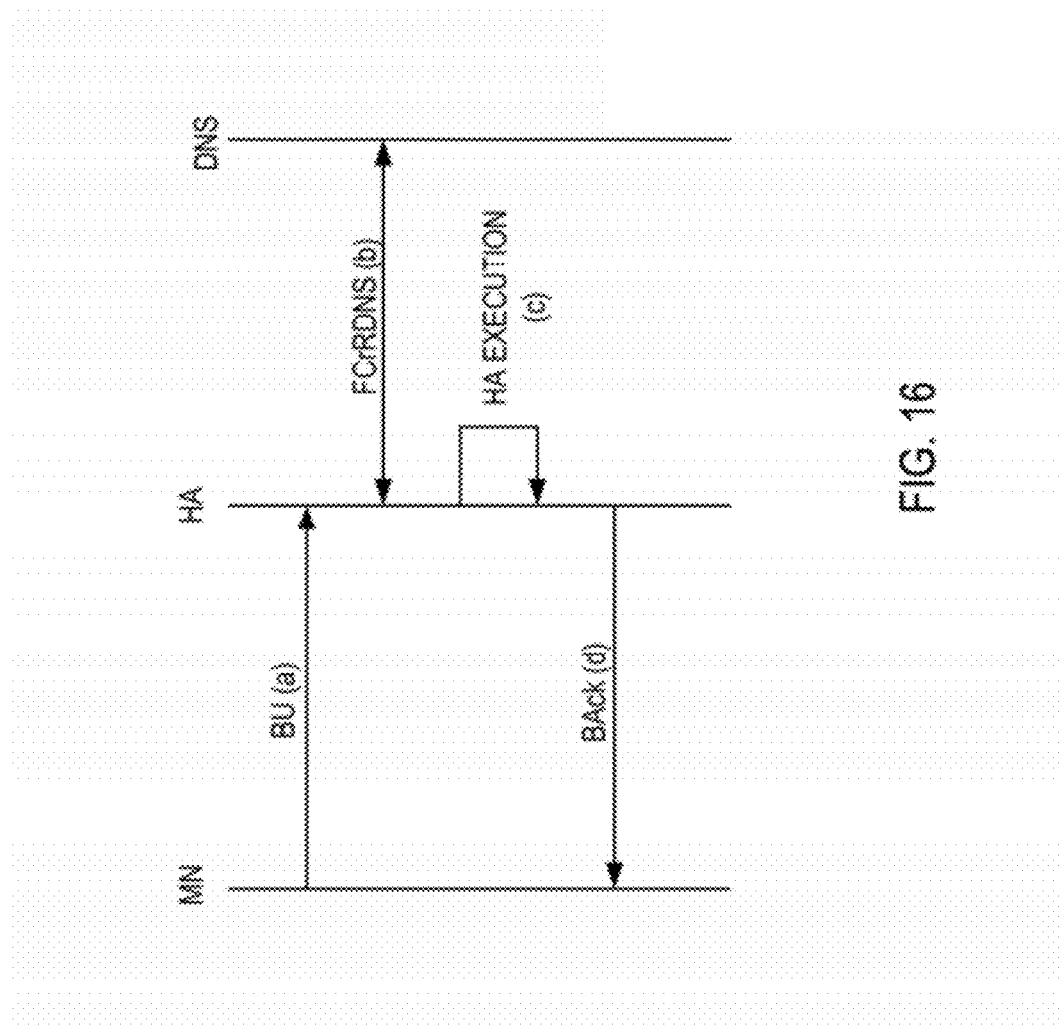
FIG. 16 illustrates an exemplary binding update procedure using CGAs and a trusted DNS to bind a care-of address for a mobile node to its home address.

Once the MN 50 attaches to the visited network 30, it must send a binding update (BU) to the HA 22 to redirect the flow of data packets to the MN's CGCoA. FIG. 16 illustrates an exemplary binding update procedure. The BU procedure incorporates the address authentication procedure shown in FIG. 9, the address generation procedures in FIGS. 8 and 10, the signature procedure in FIG. 11, the registration procedure in FIG. 12, and the domain authentication procedure shown in FIG. 13. Table 8 below summarizes the messages exchanged during the binding update procedure.

TABLE 8

Messages For Binding Update

| Enitites | Message |
| --- | --- |
| MN - HA | Binding Update. $CS_{CoA\text{-}VHA}$.CGCoA Parameters.$\{HMAC\}_{PKMN}$ |
| HA - DNS | Forward Confirmed reverse DNS lookup (CGCoA) Forward Confirmed reverse DNS lookup (CGVHA) |
| HA - MN | BAck.CGHA Parameters.$\{HMAC\}_{PKHA}$ |

FIG. 16 shows that the binding update procedure begins with the MN 50 sending a binding update message to the HA 22 (step a). The MN 50 appends to the binding update message the $CS_{CoA\text{-}VHA}$ signature, the CGCoA Parameters, and a hashed message authentication code $\{HMAC\}_{PKMN}$ signed with the private key of the MN 50. The $CS_{CoA\text{-}VHA}$ signature proves to the HA 22 that the CGCoA was validated by the VHA 32. The signed message authentication code $\{HMAC\}_{PKMN}$ proves that the binding update originates with the MN 50.

Upon receipt of the binding update, the HA 22 executes a forward-confirmed reverse DNS (FCrRDNS) on the CGCoA and CGVHA (step b). The HA 22 then performs the following to authenticate the binding update (step c):
confirm that the domains of the CGCoA and CGVHA are the same;
check "white list" to confirm that the domain of CGCoA and CGVHA is a trusted domain;
verify backward key for CGCoA;
validate CGCoA and CGVHA using corresponding CGA Parameters
verify the $CS_{CoA\text{-}VHA}$ signature;
To validate the domain of CGCoA and CGVHA, the HA 22 compares the domains of the CGCoA and CGVHA to make sure that they are the same and confirms that the domain is a trusted domain. The HA 22 then verifies that the backward key used to generate the CGCoA and the previously-stored backward key used to generate the CGHoA are part of the same backward key chain (FIG. 9). More particularly, the HA 22 hashes the backward key provided in the CGCoA Parameters one or more times and compares the results to the backward key for the CGHoA, which was stored during the home network attachment procedure (FIG. 14). A match confirms that the backward keys are part of the same backward key chain. The HA 22 validates CGCoA and CGVHA by hashing the CGCoA Parameters and CGVHA Parameters and comparing the results to the supplied CGCoA and CGVHA. Finally, the HA 22 verifies the $CS_{CoA\text{-}VHA}$ signature by hashing a concatenation of CGCoA and the CGCoa Parameters, and comparing the results to the decrypted $CS_{CoA\text{-}VHA}$ signature. If the authentication is successful, the HA 22 updates its binding table to link the CGCoA with the CGHoA for the MN 50 and sends a binding acknowledgement (BACK) message to the MN 50 (step d). The CGHA Parameters and a hashed message authentication code $\{HMAC\}_{PKHA}$ signed with the private key of the HA 22 are appended to the binding acknowledgement.

Figure 17:
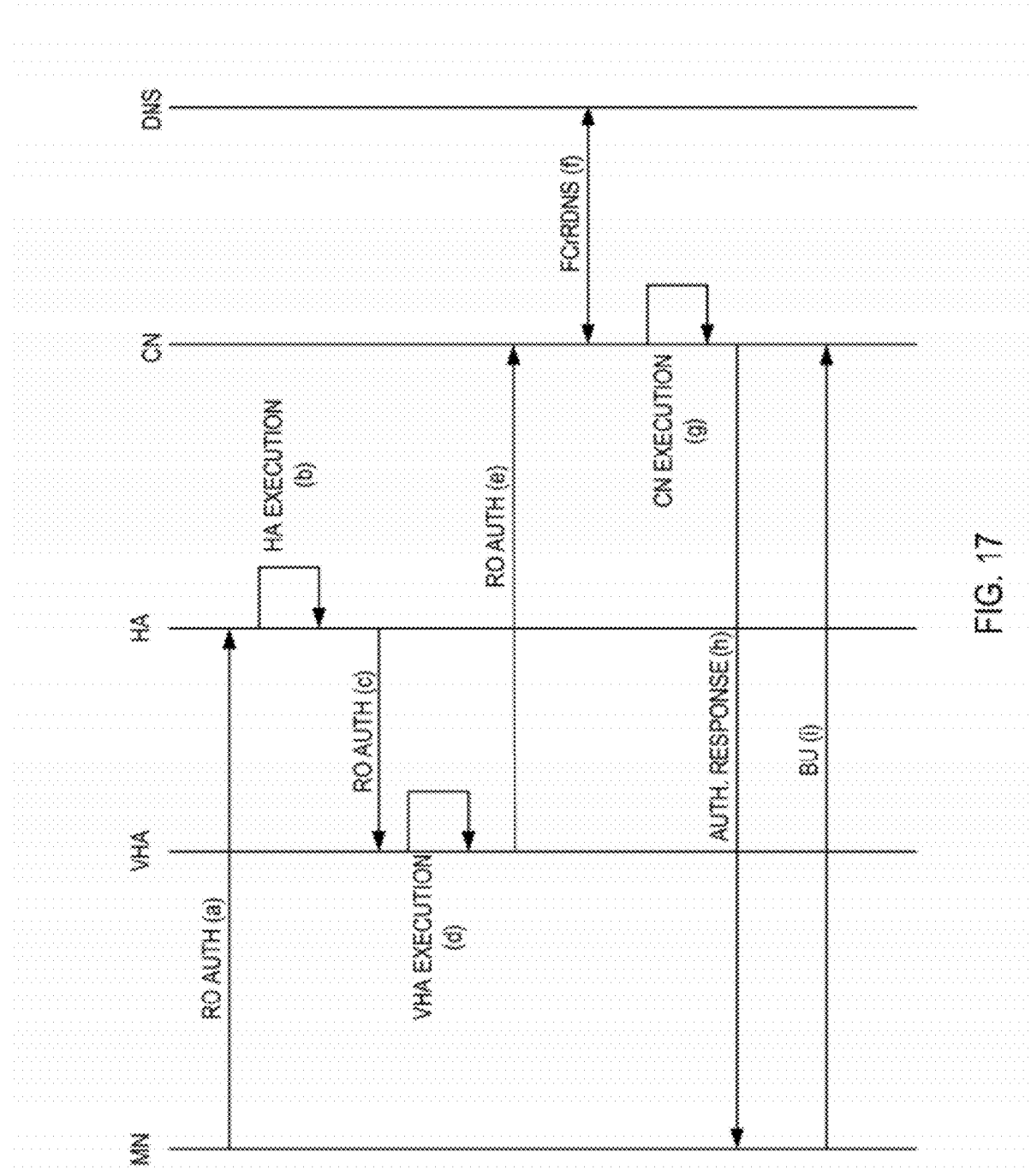
FIG. 17 illustrates an exemplary secure route optimization procedure using CGAs and a trusted DNS to establish direct communication between a mobile node and a correspondent node.

When the MN 50 has successfully attached to the visited network and updated its binding at the HA 22, the MN 50 can execute a secure route optimization (RO) procedure to communicate directly with a CN 60. FIG. 17 illustrates an exemplary route optimization procedure. The RO procedure incorporates the domain authentication procedure shown in FIG. 13. Table 9 summarizes the messages used in the secure RO procedure.

TABLE 9

Messages For Secure RO Procedure

| Enitites | Message |
|---|---|
| MN - HA | RO Authentication(CN 60.CGCoA.CGCoA Parameters.{Auth Token}$_{PKMN}$).CGCoA Parameters.{HMAC}$_{PKMN}$. |
| HA - VHA | RO Authentication(CN 60.CGCoA.CGCoA Parameters.{{Auth Token}$_{PKMN}$}$_{PKHA}$).MN 50 credentials.CGCoA Parameters.{HMAC}$_{PKHA}$. |
| VHA - CN | RO Authentication(CN 60.CGCoA.CGCoA Parameters. {{Auth Token}$_{PKMN}$}$_{PKHA}$}$_{PKVHA}$).CGVHA Parameters.{HMAC}$_{PKVHA}$ |
| CN - DNS | Forward Confirmed reverse DNS lookup (CGHoA) Forward Confirmed reverse DNS lookup (CGHA) Forward Confirmed reverse DNS lookup (CGCoA) Forward Confirmed reverse DNS lookup (CGVHA) |
| CN - MN | {AUTH Response(K$_{MN\text{-}CN\ 60}$)}$_{PublicKeyMN}$ |
| MN - CN | BU.{HMAC}K$_{MN\text{-}CN\ 60}$. |

When the MN 50 is ready to initialize route optimization, it generates an authentication token as shown in Table 5 and sends an RO authentication message to the HA 22 (step a). The RO authentication message includes the IP address of the CN 60, CGCoA, the CGCoA Parameters, and the authentication token. The authentication token links the CGCoA, CGHA, and CGVHA with the IP address of the CN 60 and is signed with the private key of the MN 50. The CGCoA Parameters and a hashed message authentication code $\{HMAC\}_{PKMN}$ signed with the private key of the MN 50 are appended to the RO authentication message. The CGCoA Parameters include the information elements used to generate CGCoA. These parameters include CGHoA the CGHoA Parameters, CGVHA, and the CGVHA Parameters. The CGHoA Parameters, in turn, include the CGHA and CGHA Parameters. The hashed message authenticating code $\{HMAC\}_{PKMN}$ authenticates to the HA 22 that the MN 50 is the sender of the RO authentication message.

Upon receipt of the RO authentication message from the MN 50, the HA 22 reviews its policies to see if RO is allowed for the MN 50 and the visited domain and validates the authentication token (step b). The authentication token is validated by hashing a concatenation of CN, CGCoA, and the CGCoA Parameters, and comparing the results to the decrypted authentication token. If the validation is successful, the HA 22 signs the authentication token that has already been signed by the MN 50 and forwards the RO Authentication message to the VHA 32 (step c). The CGCoA Parameters and a hashed message authentication code $\{HMAC\}_{PKHA}$ signed with the private key of the HA 22 are appended to the RO authentication message before it is forwarded to the CN 60. The CGCoA Parameters include the information elements used to generate the CGCoA. The hashed message authentication code $\{HMAC\}_{PKHA}$ authenticates HA 22 as the sender of the message. The HA 22 may also optionally append the MN 50 credentials to the RO authentication message. The MN 50 credentials what services are allowed for the MN 50 based on its subscription plan and what the home network will pay the visited network provider for those services. The MN 50 credentials can thus be used to limit the activities of the MN 50 in the visited network.

Upon receipt of the RO authentication message, the VHA 32 validates the authentication token and confirms that the MN 50 credentials comply with its policies of the visited network (step d). The process of validating the authentication token is the same as previously described. In this case, the VHA 32 must decrypt the signed authentication token using the public keys of both the HA 22 and MN 50. After validating the authentication token, the VHA 32 adds its own signature to the authentication token on top of the signatures of the MN 50 and HA 22. The VHA 32 also appends the CGVHA Parameters and a message authentication code with its own private key $\{HMAC\}_{PKVHA}$ to the RO authentication message and forwards the RO authentication message to the CN 60 (step e).

Upon receipt of the RO authentication message from the VHA 32, the CN 60 executes a forward-confirmed reverse DNS on the CGHoA and CGHA to make sure that their domain is the same (step f) (FIG. 13). The CN 60 also executes a second forward-confirmed reverse DNS on the CGCoA and CGVHA to confirm that the domain is the same for both (FIG. 13).

If the domains of the CGAs are validated, the CN 60 next validates the message through validation of CGCoA, CGHoA, CGVHA, and CGHA and, if successful, generates a symmetric key $K_{MN\text{-}CN}$ to use for encrypted communications with the MN 50 (step g). As previously described, the CGAs are validated by executing hash-1 on the corresponding CGA Parameters and comparing the results to the supplied CGAs. The CN 60 initially validates CGCoA using the CGCoA Parameters. The CGCoA Parameters include the CGHoA, the CGHoA Parameters, the CGVHA, and the CGVHA Parameters. Thus, after validating the CGCoA, the CN 60 can validate the CGHoA and CGVHA using the CGHoA and CGVHA Parameters. The CGHoA Parameters, in turn, include the CGHA and CGHA Parameters. Thus, after validating the CGHoA, the CN 60 can validate the CGHA using the supplied CGHA Parameters. In some embodiments, the CN 60 may also confirm that the CGHoA and its Parameters are the same as the current one used for bi-directional tunneling. Once the addresses are validated, the CN 60 generates a symmetric key $K_{MN\text{-}CN}$ for encrypting communications between the MN 50 and the CN 60.

The CN 60 sends an authentication response containing the symmetric key $K_{MN\text{-}CN}$ to the MN 50 (step h). The authentication response is encrypted with the public key of the MN 50 to prevent an interloper from discovering the symmetric key $K_{MN\text{-}CN}$. At this point, the MN 50 can then send data packets directly to the CN 60 using the symmetric key $K_{MN\text{-}CN}$ to encrypt the communications. The CN 60 can send packets directly to the CGCoA of the MN 50. As long as the MN 50 remains in the same visited network, the MN 50 may send binding updates to the CN 60 whenever it changes its CGCoA (step i). A change in the CGCoA may occur when the MN 50 changes its access point. Also, the MN 50 may periodically change its CGCoA as a security measure to thwart a man-in-the-middle attack. The binding update includes the new CGCoA. A hashed message authentication code.$\{HMAC\}_{PKMN}$ signed with the symmetric key $K_{MN\text{-}CN}$ is appended to the binding update to authenticate the MN 50 as the sender of the binding update. When the MN 50 changes to a different visited network 30, the authentication token must be signed by the new VHA 32.

When the MN 50 detaches from the visited network while its connections are still active, the VHA 32 can inform the CN 60 to stop sending data by sending a flush request (FR) message. The FR message contains the IP address of the CN 60, CGCoA of the MN 50, and the CGCoA Parameters. The CGVHA Parameters and message authentication code $\{HMAC\}_{PKVHA}$ signed by the VHA 32 are appended to the FR message. Upon receipt of the FR message, the CN 60 validates the message using the appended message authentication code $\{HMAC\}_{PKVHA}$. If the message is authenticated, the CN 60 stops sending packets directly to the MN 50. At this point, the CN 60 may go back to bi-directional tunneling in order to reach the MN 50.

FIG. 18 illustrates an exemplary network node 200, which may be used to implement the secure route optimizations procedure and related procedures described herein. The network node 200 may function as a MN 50, HA 22, VHA 32, or CN 60. The network node 200 includes a network interface 210 communicating with remote network nodes. The network interface 210 may, for example comprise a cellular radio interface 212, a wireless local area network (WLAN) interface 214, an Ethernet interface 216, or other type of interface. The network node may include more than one network interface 210. For example, an MN 50 may include both a cellular radio interface and WLAN interface. On the other hand, a HA 22 or VHA 32 may have only a single type of interface, such as an Ethernet interface, for interfacing to a wired network. The network interface 210 interfaces with a processor circuit 220. The processor circuit 220 includes one or more microprocessors 222, a cryptographic processing engine 224, and memory 226. The memory 226 includes program code 230 for use by the processor circuit 220 in executing one or more of the various procedures described herein, and may also include secure storage 232 for storing cryptographic parameters, identifiers, certificates, and the like.

Those skilled in the art will appreciate that the various methods and processes described herein may be implemented using various hardware configurations that generally, but not necessarily, include the use of one or more microprocessors, microcontrollers, digital signal processors, or the like, coupled to memory storing software instructions for carrying out the techniques described herein. In particular, those skilled in the art will appreciate that the circuits of various embodiments of the MN 50, HA 22, VHA 32, and CN 60 may be configured in ways that vary in certain details from the broad descriptions given above. For instance, one or more of the processing functionalities discussed above may be implemented using dedicated hardware, rather than a microprocessor configured with program instructions. Such variations, and the engineering tradeoffs associated with each, will be readily appreciated by the skilled practitioner. Since the design and cost tradeoffs for the various hardware approaches, which may depend on system-level requirements that are outside the scope of the present disclosure, are well known to those of ordinary skill in the art, further details of specific hardware implementations are not provided herein.

The present invention enables a more secure route optimization (RO) procedure for MIPv6. By incorporating a backward key chain, cascaded CGAs, and DNSSEC, the present invention provides a more secure and efficient mechanism for secure route optimization (RO) procedure for MIPv6. The techniques herein described better protect signaling messages, such as the binding update (BU), in untrusted networks between a MN 50 and a CN 60 while, at the same time, reducing signaling overhead. The secure RO procedure is designed to be as secure as alternate solutions, such as BU and HCBU, while relying on realistic assumptions and solutions that are either existing or near to being deployed. By validating CGAs (pseudonyms) through the use of DNSSEC and trusted domains managed by trusted third parties, the secure route optimization procedure provides authentication globally, rather than relying on sender invariance. The secure route optimization procedure also provides more flexibility and control to mobile service providers.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of making communications over a public IP network by a mobile node more secure, said method being implemented by a home agent at a network node, comprising:
   receiving in a signature request message at said network node, a first network address for said mobile node, said first network address being logically linked with a second network address and said first and second addresses being cryptographically derived from keys of a backward key chain generated by said mobile node, said second network address being used by said mobile node to communicate with said home agent;
   generating a cryptographic signature binding said first network address for the mobile node with said second network address for the home agent;
   sending to said mobile node a signature response message including said cryptographic signature;
   validating said first network address by verifying the logical link between said first and second network addresses;
   if said first address is validated, generating a domain name for said mobile node; and
   registering said domain name and said first network address with a trusted domain name server to create an association between said domain name and said first network address.

2. The method of claim 1 wherein said home agent resides in a home network of said mobile node, said first network address comprises a home address of said mobile node, and said second network address comprises a home agent address for said home agent.

3. The method of claim 2 further comprising:
   receiving, with said signature request message, secret information shared between said home agent and said mobile node; and
   using said secret information to authenticate said mobile node as the sender of said signature request message.

4. The method of claim 3 wherein said secret information comprises one of a shared secret key and an authentication token.

5. The method of claim 1 wherein said home agent comprises a visited home agent in a visited network, said first network address comprises a care-of address of said mobile node, and said second network address comprises a home address of said mobile node.

6. The method of claim 5 wherein validating said first network address further comprises validating said home address of said mobile node.

7. The method of claim 6 wherein validating said home address of said mobile node comprises:
   receiving, with said signature request message, a signature from a trusted authority binding said home address of said mobile node with a home agent address; and validating said home address of said mobile node with said signature from said trusted authority.

8. The method of claim 7 wherein said home address of said mobile node and said home agent address are logically-linked and wherein validating said first network address further comprises verifying the logical link between said home address of said mobile node and said home agent address.

9. A network node operating as a home agent in a communication network for making communications over a public IP network by a mobile node more secure, said network node comprising:
 a network interface for communicating with other nodes over said communication network;
 a processor circuit connected to said network interface and configured to:
 receive in a signature request message a first network address for said mobile node, said first network address being logically linked with a second network address and said first address and second address being cryptographically derived from keys of a backward key chain generated by said mobile node, said second network address being used by said mobile node to communicate with said home agent;
 generate a cryptographic signature binding said first network address for said mobile node with said second network address for said home agent;
 send to said mobile node a signature response message including said cryptographic signature
 validate said first network address by verifying said logical link between said first and second network addresses;
 if said first address is validated, generate a domain name for said mobile node; and
 register said domain name and said first network address with a trusted domain name server to create an association between said domain name and said first network address.

10. The network node of claim 9 wherein said home agent resides in a home network of said mobile node, said first network address comprises a home address of said mobile node, and said second network address comprises a home agent address for said home agent.

11. The network node of claim 10 wherein said processor circuit is further configured to:
 receive, with said signature request message, secret information shared between said home agent and said mobile node; and
 use said secret information to authenticate said mobile node as the sender of said signature request message.

12. The network node of claim 11 wherein said secret information comprises one of a shared secret key and an authentication token.

13. The network node of claim 9 wherein said home agent comprises a visited home agent in a visited network, said first network address comprises a care-of address of said mobile node, and said second network address comprises a home address of said mobile node.

14. The network node of claim 13 wherein said processor circuit validates said first network address by validating said home address of said mobile node.

15. The network node of claim 14 wherein said processor circuit further validates said first network address by:
 receiving, with said signature request message, a signature from a trusted authority binding said home address of said mobile node with a home agent address; and
 validating said home address of said mobile node with said signature from said trusted authority.

16. The network node of claim 15 wherein the home address of said mobile node and said home agent address are logically-linked and wherein said processor circuit further validates said first network address by verifying said logical link between said home address of said mobile node and said home agent address.

* * * * *

UNITED STATES PATENT AND TRADEMARK OFFICE
CERTIFICATE OF CORRECTION

PATENT NO. : 8,498,414 B2
APPLICATION NO. : 12/969072
DATED : July 30, 2013
INVENTOR(S) : Rossi It is certified that error appears in the above-identified patent and that said Letters Patent is hereby corrected as shown below:

In the Drawings:

In Fig. 14, Sheet 13 of 17, delete "FCrRDNS" and insert -- FCrDNS --, therefor.

In Fig. 15, Sheet 14 of 17, delete "FcRRDNS" and insert -- FCrDNS --, therefor.

In Fig. 16, Sheet 15 of 17, delete "FCrRDNS" and insert -- FCrDNS --, therefor.

In Fig. 17, Sheet 16 of 17, delete "FCrRDNS" and insert -- FCrDNS --, therefor.

In Fig. 18, Sheet 17 of 17, delete "CELLULAR RADIO INTERFACE 214" and insert -- WIRELESS LOCAL AREA NETWORK (WLAN) INTERFACE 214 --, therefor.

In the Specification:

In Column 1, Line 38, delete "Proposal" and insert -- Consideration --, therefor.

In Column 5, Line 10, delete "KCN" and insert -- $K_{CN}$ --, therefor.

In Column 5, Line 40, delete "(KBU)." and insert -- $(K_{BU})$. --, therefor.

In Column 6, Line 17, delete "KDH" and insert -- $K_{DH}$ --, therefor.

In Column 11, Lines 54-55, delete "key s." and insert -- keys. --, therefor.

In Column 12, Line 1, delete "H$^x$(b$_j$)" and insert -- $H^x(b_j)$ --, therefor.

In Column 12, Line 62, delete "b$_j$," and insert -- $b_j$ --, therefor.

Signed and Sealed this
Twenty-fifth Day of March, 2014

Michelle K. Lee
*Deputy Director of the United States Patent and Trademark Office*

CERTIFICATE OF CORRECTION (continued)
U.S. Pat. No. 8,498,414 B2

In Column 12, Line 65, delete "$b_j$," and insert -- $b_j$ --, therefor.

In Column 16, Line 16, delete "VA" and insert -- HA --, therefor.

In Column 17, Line 29, delete "$b_j$, is a" and insert -- $b_j$ is a --, therefor.

In Column 17, Line 30, delete "receiving $b_j$," and insert -- receiving $b_j$ --, therefor.

In Column 18, Line 4, delete "Enitites" and insert -- Entities --, therefor.

In Column 18, Line 27, delete "GCHoA," and insert -- CGHoA, --, therefor.

In Column 19, Line 40, delete "FDQN" and insert -- FQDN --, therefor.

In Column 20, Line 14, delete "Enitites" and insert -- Entities --, therefor.

In Column 20, Line 17, delete "CGCoHA" and insert -- CGCoA --, therefor.

In Column 21, Line 18, delete "(FCrRDNS)" and insert -- (FCrDNS) --, therefor.

In Column 21, Line 30, delete "Parameters" and insert -- Parameters; --, therefor.

In Column 21, Line 31, delete "signature;" and insert -- signature. --, therefor.

In Column 22, Line 16, delete "Enitites" and insert -- Entities --, therefor.

In Column 22, Line 34, delete "(FCrRDNS)" and insert -- (FCrDNS) --, therefor.

In Column 22, Line 44, delete "Parameters" and insert -- Parameters; --, therefor.

In Column 22, Line 45, delete "signature;" and insert -- signature. --, therefor.

In Column 22, Line 62, delete "CGCoa" and insert -- CGCoA --, therefor.

In Column 23, Line 1, delete "$\{HMAC\}_{PkHA}$" and insert -- $\{HMAC\}_{PKHA}$ --, therefor.

In Column 23, Line 17, delete "Enitites" and insert -- Entities --, therefor.

In Column 24, Line 63, delete "code." and insert -- code --, therefor.

In the Claims:

In Column 27, Line 29, in Claim 9, delete "signature" and insert -- signature; --, therefor.